(12) United States Patent
Komoni

(10) Patent No.: US 10,482,419 B2
(45) Date of Patent: Nov. 19, 2019

(54) SENSOR DEVICE HAVING CONFIGURATION CHANGES

(71) Applicant: Tive, Inc., Cambridge, MA (US)

(72) Inventor: Krenar Komoni, Worcester, MA (US)

(73) Assignee: Tive, Inc., Cambridge, MA (US)

(*) Notice: Subject to any disclaimer, the term of this patent is extended or adjusted under 35 U.S.C. 154(b) by 0 days.

(21) Appl. No.: 16/039,904

(22) Filed: Jul. 19, 2018

(65) Prior Publication Data

US 2018/0322454 A1 Nov. 8, 2018

Related U.S. Application Data

(63) Continuation-in-part of application No. 15/383,762, filed on Dec. 19, 2016.

(60) Provisional application No. 62/269,090, filed on Dec. 17, 2015.

(51) Int. Cl.
| | | |
|---|---|---|
| *G06Q 10/08* | (2012.01) | |
| *G08C 17/02* | (2006.01) | |
| *H04W 4/80* | (2018.01) | |
| *H04Q 9/00* | (2006.01) | |
| *H04W 84/18* | (2009.01) | |

(Continued)

(52) U.S. Cl.
CPC ....... *G06Q 10/0833* (2013.01); *G06Q 10/087* (2013.01); *G08C 17/02* (2013.01); *H04Q 9/00* (2013.01); *H04W 4/80* (2018.02); *G06Q 30/04* (2013.01); *H04Q 2209/40* (2013.01); *H04Q 2209/823* (2013.01); *H04W 84/12* (2013.01); *H04W 84/18* (2013.01)

(58) Field of Classification Search
CPC .................................................. G06Q 10/0833
See application file for complete search history.

(56) References Cited

U.S. PATENT DOCUMENTS

| | | |
|---|---|---|
| 5,313,848 A | 5/1994 | Santin et al. |
| 7,057,495 B2 | 6/2006 | Debord et al. |
| 7,233,247 B1 | 6/2007 | Crossno et al. |

(Continued)

FOREIGN PATENT DOCUMENTS

| | | |
|---|---|---|
| GB | 2546287 A | 7/2017 |
| GB | 2546288 A | 7/2017 |

OTHER PUBLICATIONS

AeroAstro Initiates SENS Remote Data Monitoring Service in North America; May 13, 2003; Retrieved from the internet on Jun. 16, 2017; URL http://www.spacedaily.com/reports/AeroAstro_Initiates_SENS_Remote_Data_Monitoring_Service_in_North_America.html; 3 Pages.

(Continued)

*Primary Examiner* — Manuel L Barbee
*Assistant Examiner* — Raymond L Nimox
(74) *Attorney, Agent, or Firm* — Daly, Crowley, Mofford & Durkee, LLP

(57) ABSTRACT

Methods and apparatus for configuring a sensor device in accordance with a first configuration defining data collection for a plurality of sensors and defining when the collected data for the sensors is transmitted to a remote network. The sensor device can coupled to a shipping container for collecting environmental data as the shipping container is en route to a destination. The sensor device can receive a transition signal from the remote network instructing the sensor device to transition to a second configuration with different transmission parameters.

21 Claims, 43 Drawing Sheets

US 10,482,419 B2

Page 2

(51) Int. Cl.
*H04W 84/12* (2009.01)
*G06Q 30/04* (2012.01)

(56) References Cited

U.S. PATENT DOCUMENTS

| | | | |
|---|---|---|---|
| 7,475,806 B1 | 1/2009 | Crossno et al. | |
| 7,538,681 B1 | 5/2009 | Sharma et al. | |
| 7,652,576 B1 | 1/2010 | Crossno et al. | |
| 7,791,455 B1 | 9/2010 | MacLean, III et al. | |
| 7,856,339 B2 | 12/2010 | Vock et al. | |
| 8,169,299 B2 | 5/2012 | Sharma | |
| 8,280,682 B2 | 10/2012 | Vock et al. | |
| 8,428,904 B2 | 4/2013 | Vock et al. | |
| 8,502,672 B1 | 8/2013 | Crossno | |
| 8,626,193 B1 | 1/2014 | Crossno et al. | |
| 8,655,378 B1 | 2/2014 | Crossno et al. | |
| 8,660,814 B2 | 2/2014 | Vock et al. | |
| 8,818,351 B1 | 8/2014 | Crossno et al. | |
| 8,838,065 B1 | 9/2014 | Crossno et al. | |
| 8,868,102 B1 | 10/2014 | Crossno et al. | |
| 8,886,215 B1 | 11/2014 | Crossno et al. | |
| 8,886,216 B1 | 11/2014 | Crossno et al. | |
| 8,989,954 B1* | 3/2015 | Addepalli | H04W 4/046 |
| | | | 701/32.3 |
| 9,020,536 B1 | 4/2015 | Crossno et al. | |
| 9,064,225 B2 | 6/2015 | Nakra et al. | |
| 9,267,793 B2 | 2/2016 | Vock et al. | |
| 9,349,270 B1 | 5/2016 | Crossno | |
| 9,351,254 B2 | 5/2016 | Backholm et al. | |
| 9,888,363 B2 | 2/2018 | Addepalli et al. | |
| 9,998,969 B2* | 6/2018 | Maguire | H04M 1/72583 |
| 2002/0017989 A1 | 2/2002 | Forster et al. | |
| 2005/0157774 A1 | 7/2005 | DiLuiso et al. | |
| 2006/0238347 A1 | 10/2006 | Parkinson et al. | |
| 2007/0203650 A1 | 8/2007 | Jensen et al. | |
| 2007/0296277 A1 | 12/2007 | Lee et al. | |
| 2009/0014837 A1 | 1/2009 | Park | |
| 2009/0061897 A1 | 3/2009 | Hamilton et al. | |
| 2009/0113113 A1 | 4/2009 | Steele, Jr. et al. | |
| 2009/0215259 A1 | 8/2009 | Lee et al. | |
| 2009/0306839 A1 | 12/2009 | Youngquist et al. | |
| 2009/0323648 A1* | 12/2009 | Park | H04W 8/005 |
| | | | 370/338 |
| 2010/0248662 A1 | 9/2010 | Sheynblat et al. | |
| 2010/0267375 A1 | 10/2010 | Lemmon et al. | |
| 2011/0125454 A1 | 5/2011 | Wengler | |
| 2011/0163412 A1 | 7/2011 | Park | |
| 2012/0149352 A1 | 6/2012 | Backholm et al. | |
| 2013/0083722 A1* | 4/2013 | Bhargava | H04W 48/20 |
| | | | 370/315 |
| 2013/0321122 A1 | 12/2013 | Lee et al. | |
| 2013/0321211 A1 | 12/2013 | Chakraborty et al. | |
| 2013/0324059 A1 | 12/2013 | Lee et al. | |
| 2013/0324151 A1 | 12/2013 | Lee et al. | |
| 2013/0324152 A1 | 12/2013 | Lee et al. | |
| 2014/0018023 A1 | 1/2014 | Lee et al. | |
| 2014/0085055 A1 | 3/2014 | Lee et al. | |
| 2014/0187261 A1 | 7/2014 | Lee et al. | |
| 2014/0235188 A1 | 8/2014 | Lee et al. | |
| 2014/0379605 A1 | 12/2014 | Herjólfsson et al. | |
| 2015/0241566 A1 | 8/2015 | Chakraborty et al. | |
| 2015/0262123 A1 | 9/2015 | Sharma et al. | |
| 2015/0296332 A1 | 10/2015 | Lee et al. | |
| 2015/0324742 A1 | 11/2015 | Herjólfsson et al. | |
| 2016/0014554 A1* | 1/2016 | Sen | H04W 4/029 |
| | | | 455/456.2 |
| 2016/0021169 A1 | 1/2016 | Chan | |
| 2016/0116310 A1 | 4/2016 | Brynjúlfsson et al. | |
| 2016/0142891 A1* | 5/2016 | Virhia | G06Q 10/00 |
| | | | 340/870.07 |
| 2017/0208426 A1 | 7/2017 | Komoni et al. | |

OTHER PUBLICATIONS

U.S. Non-Final Office Action dated May 31, 2019 for U.S. Appl. No. 15/383,762; 18 Pages.

Preliminary Amendment and Response to Restriction Requirement dated Jan. 17, 2019 for U.S. Appl. No. 15/383,762; Response filed Mar. 18, 2019; 8 Pages.

* cited by examiner

FIG. 1E

| ACTION | INPUT | OUTPUT |
|---|---|---|
| Turn On – when device is off | 2 second press | 3 green blinks |
| Turn Off – when device is on | 2 second press | 3 red blinks |
| Check Status | 2 consecutive button press | All systems good: 1 green, 1 blue, 1 red Problem: 2 long red |
| Send Data (override – send all current data) | 4 consecutive button press | 3 blue blink confirmation if unable to send: 2 long red |
| 3 second input timeout | | |

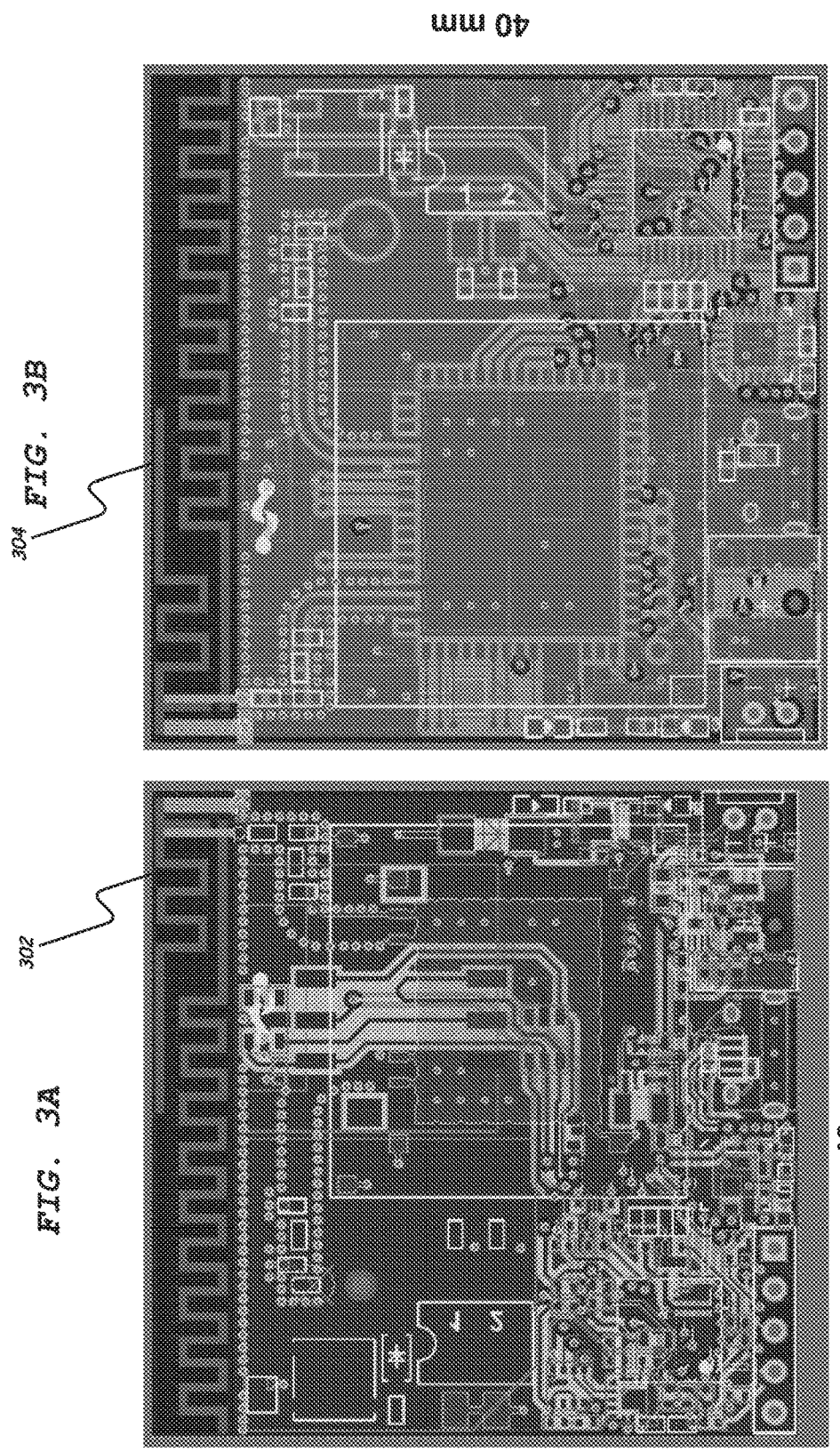

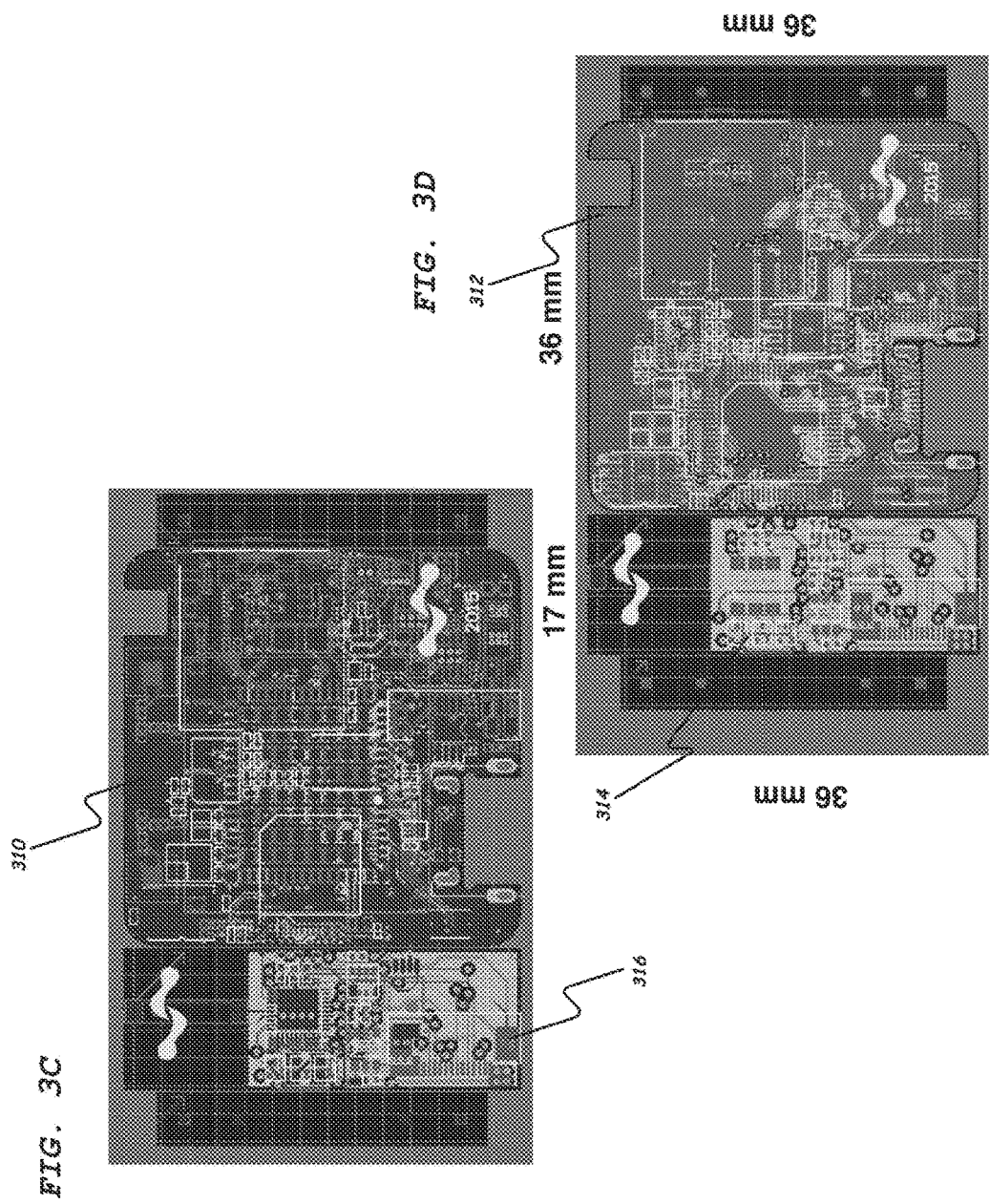

FIG. 19 — 1900

| | Peak Rate | System B/W | Coverage MCL | Battery Life | Latency | Mobility | Spectrum / Deployment |
|---|---|---|---|---|---|---|---|
| Release 12 LTE-MTC | 1 Mbps | 1.4 to 20 MHz | 140.7 dB | New PSM for device-originated applications Target: ~5-10 years. | Typical LTE latency | Full | - Coexists with other LTE services<br>- Can use all LTE spectrum |
| Release 13 LTE-MTC (or eMTC) | ~10s of kbps up to 1 Mbps | 1.08 MHz | >155.7 dB with coverage enhancement | Additional enhanced power save modes for device-terminated applications + efficient signaling Target: ~5-10 years. | Bundled TTI for coverage enhancement increases latency | Limited-to-no mobility with coverage enhancement | - Coexists with other LTE services<br>- Can use all LTE spectrum |
| Release 13 CIoT proposal | 10s of kbps | 200 kHz | >164 dB | Target: 10+ years Based on 1 report/day @ ~200 bytes | Seconds of latency | None (cell reselection only) | - Main target to re-farm GSM spectrum<br>- Other LTE-based deployment scenarios under study | tive

<Device Name>
<Device Name>

<Device Name> <Location Name, ST>  <Account Name>  Sign Out

— 2700
— 2702

GENERAL

| MODULE NAME | [DEVICE NAME] Edit |
| MODULE ID # | 123456789123 |
| MODULE OWNER | [Owner Name] |
| ALERT NOTIFICATION | |
| CELL PHONE # | [(123) 456-7890] |
| EMAIL ADDRESS | name@email.com |

— 2704

MODULE SENSORS — 2708

| ⊙ LOCATION | ON \| OFF |
| ⌁ ACTIVITY | ON \| OFF |
| 🌡 TEMPERATURE | ON \| OFF |
| ◊ HUMIDITY | ON \| OFF |
| ⊘ PRESSURE | ON \| OFF |
| ☼ LIGHT | ON \| OFF |
| ⊙ SPEED | Activate |

CELLULAR NETWORK

| CURRENT NETWORK | AT&T |
| SIGNAL STRENGTH | GOOD |
| CELLULAR DATA USAGE | |
| CURRENT PERIOD | 1.4 MB |
| LIFETIME | 30.7 GB |
| USAGE ALERT | ON \| OFF |

— 2706

COMMUNICATION SETTINGS — 2710

| SENSOR FREQUENCY | 30SEC ▶ |
| ESTIMATED BATT LIFE | 4 DAYS 3 HOURS 20 MIN |
| ✻ BLUETOOTH | ON \| OFF |
| BATTERY LIFE | |
| CURRENT LIFE | 82% |
| LOW BATT ALERT | ON \| OFF |

*FIG. 27*

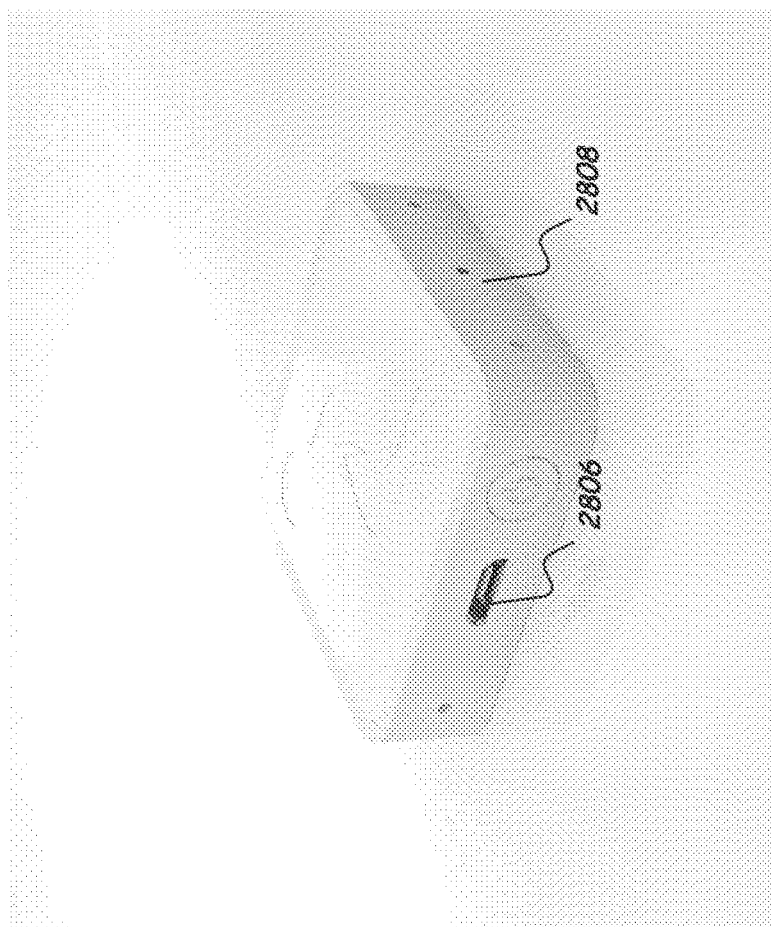
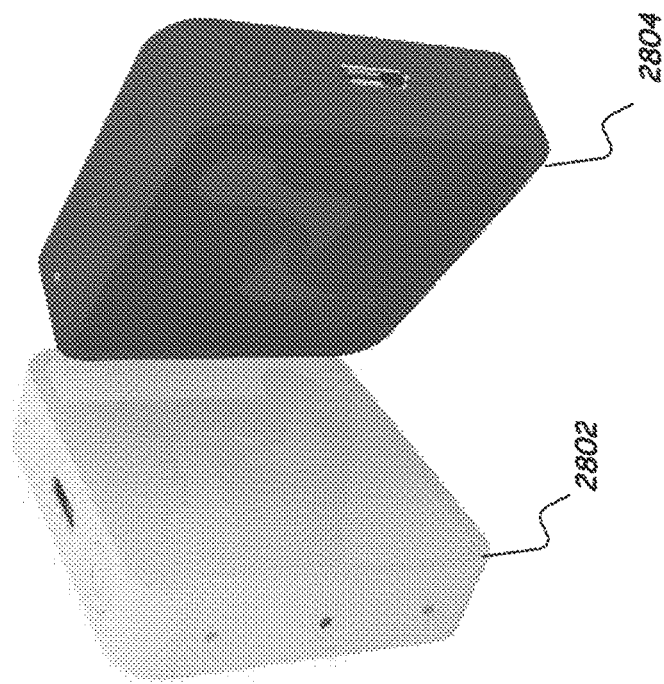
FIG. 28

SENSOR DEVICE HAVING CONFIGURATION CHANGES

CROSS REFERENCE TO RELATED APPLICATION

The present application is a CIP of U.S. patent application Ser. No. 15/383,762, filed on Dec. 19, 2016, which claims priority from U.S. Provisional Patent Application No. 62/269,090 filed on Dec. 17, 2015, entitled "MULTI SENSOR DEVICE WITH CONNECTIVITY AND SENSING AS A SERVICE PLATFORM AND WEB APPLICATION," all of which are hereby incorporated by reference.

BACKGROUND

Sensing has promoted technological innovation and has led to miniaturization of many types of sensors. The miniaturization of sensors such as accelerometers, gyroscopes, and magnetometer has occurred mainly due to the advances in Microelectromechanical Systems (MEMS) and has enabled the industry to combine many similar sensors in small areas. The challenge, however, is in intelligently and efficiently combining connectivity modules with sensors so that the sensor readings and measurements can be stored on the Internet (e.g., in the cloud in data centers), which then can be consumed and analyzed by various end-parties for various applications.

BRIEF DESCRIPTION OF THE DRAWINGS

FIG. 1E is a chart showing exemplary power button inputs and LED outputs for the device in accordance with one or more embodiments.

FIGS. 3A and 3B illustrate an exemplary PCB layout for an electronic device with WWAN connectivity and multiple sensors in accordance with one or more embodiments.

FIGS. 3C and 3D illustrates an exemplary PCB layout for an electronic device with two PCBs in accordance with some embodiments.

8A and 8B illustrate an exemplary ambient light detection application in accordance with one or more embodiments.

Figure 9:
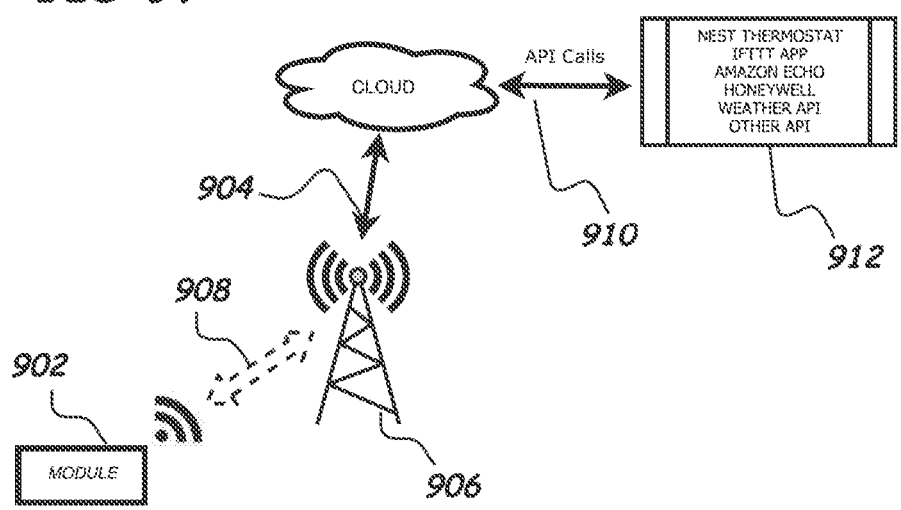

FIG. 9 illustrates an exemplary application in which an API is integrated with other external APIs in accordance with one or more embodiments.

Figure 10:
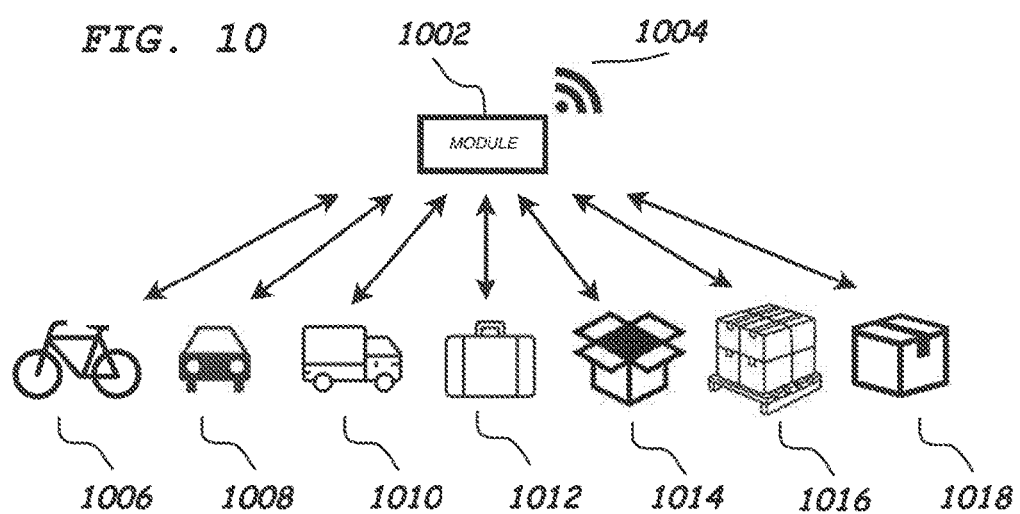

FIG. 10 illustrates an exemplary asset track, sense, and trace application in accordance with one or more embodiments.

Figure 11:
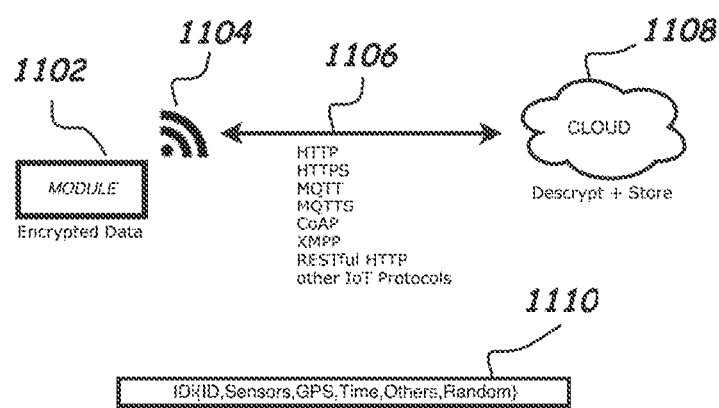

FIG. 11 illustrates an exemplary security implementation from an electronic device to the cloud in accordance with one or more embodiments.

Figure 12:
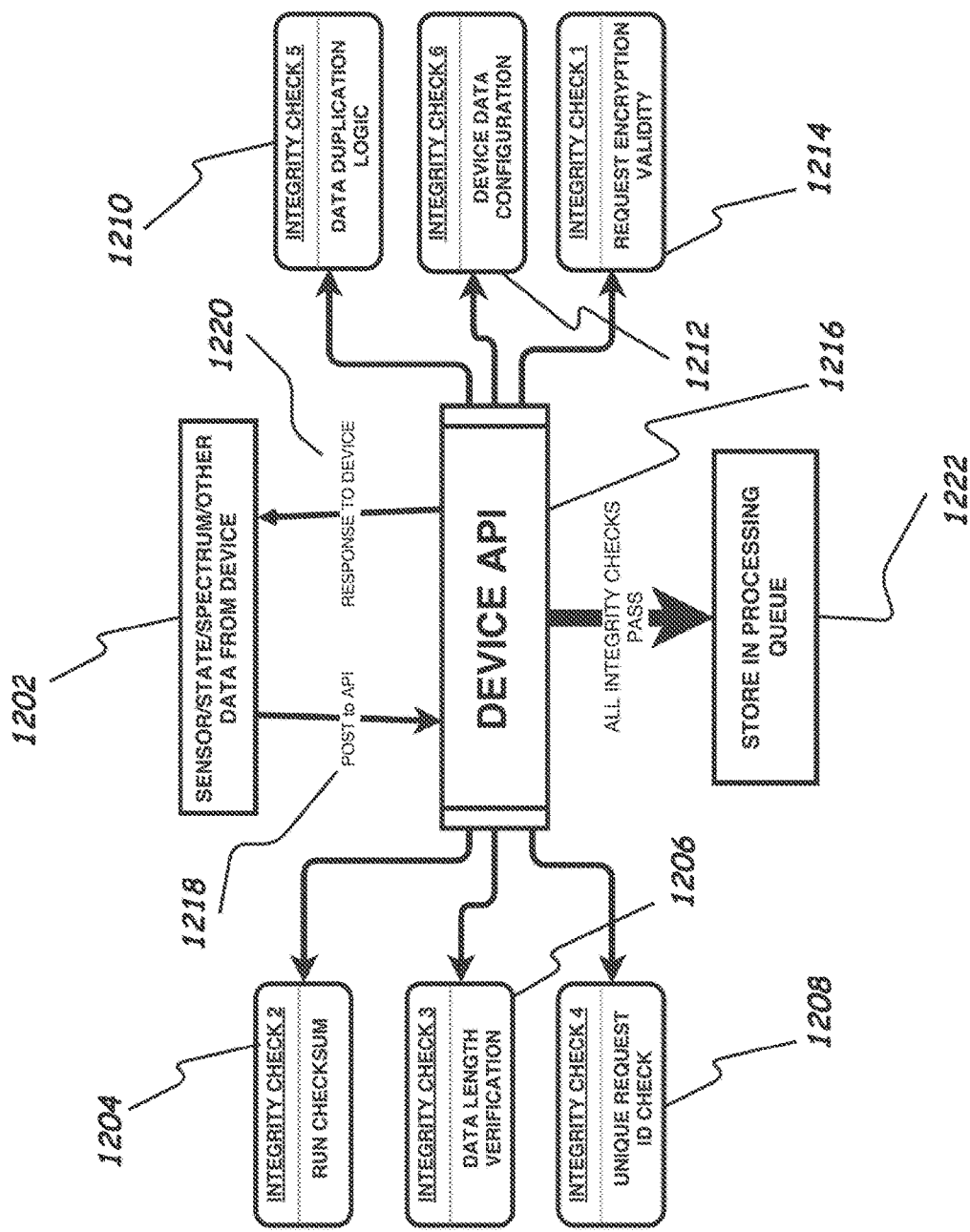

FIG. 12 is a block diagram illustrating an exemplary cloud based architecture for accepting and sending data to electronic devices in accordance with one or more embodiments.

Figure 13:
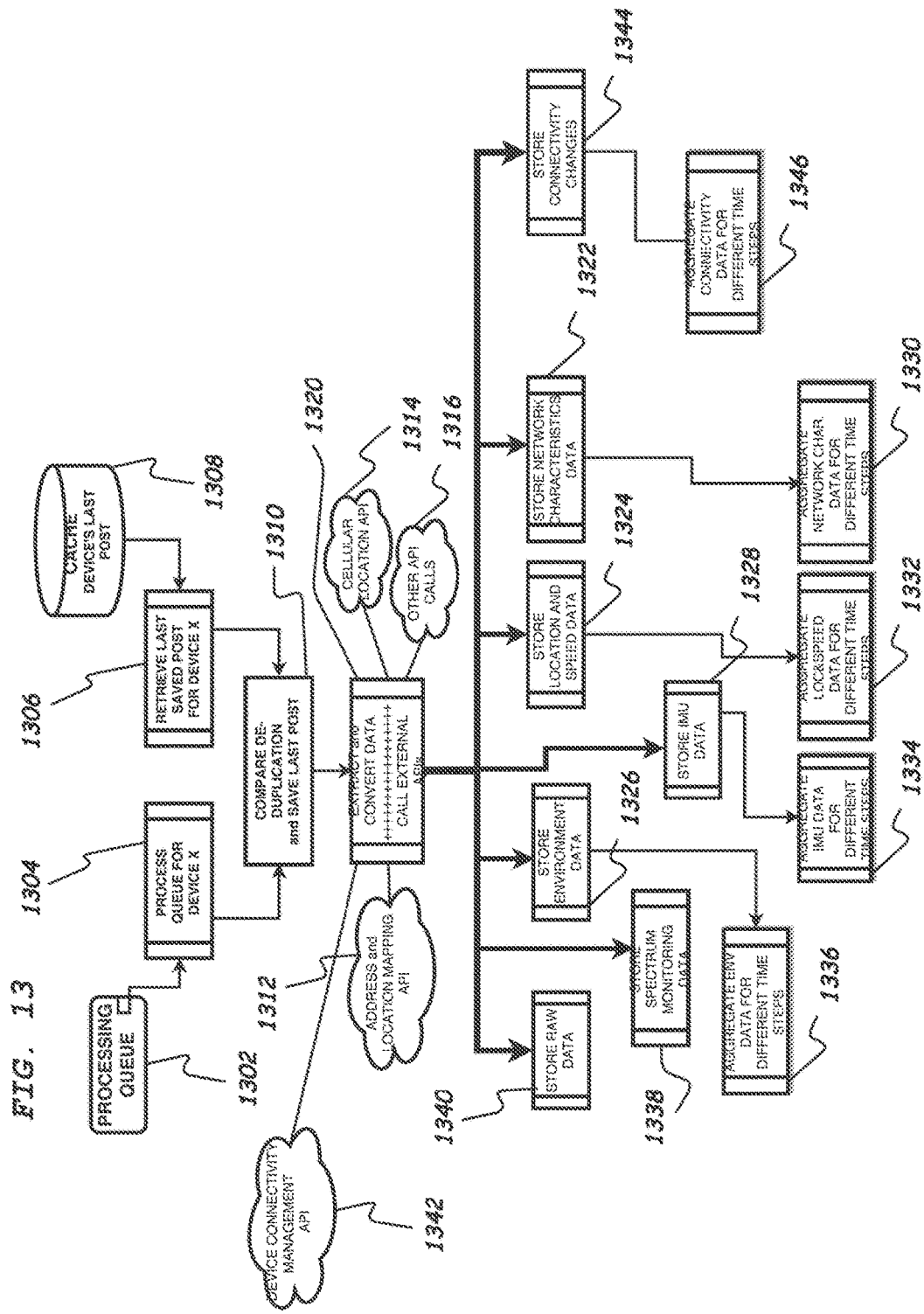

FIG. 13 is a block diagram illustrating an exemplary cloud based architecture in accordance with one or more embodiments for processing data that is obtained by an electronic device and data from external API calls.

Figure 14:
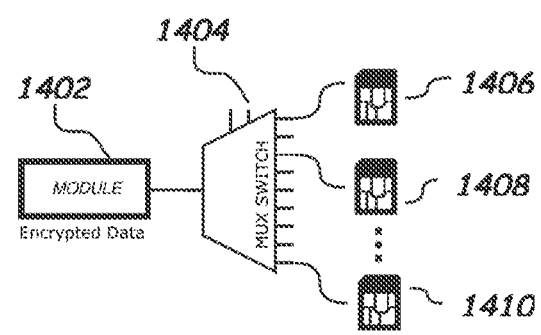

FIG. 14 illustrates an exemplary usage of dual SIM cards in order to achieve cost effective global coverage using minimum number of electronic device product Stock Keeping Units (SKUs) In accordance with one or more embodiments.

Figure 15A:
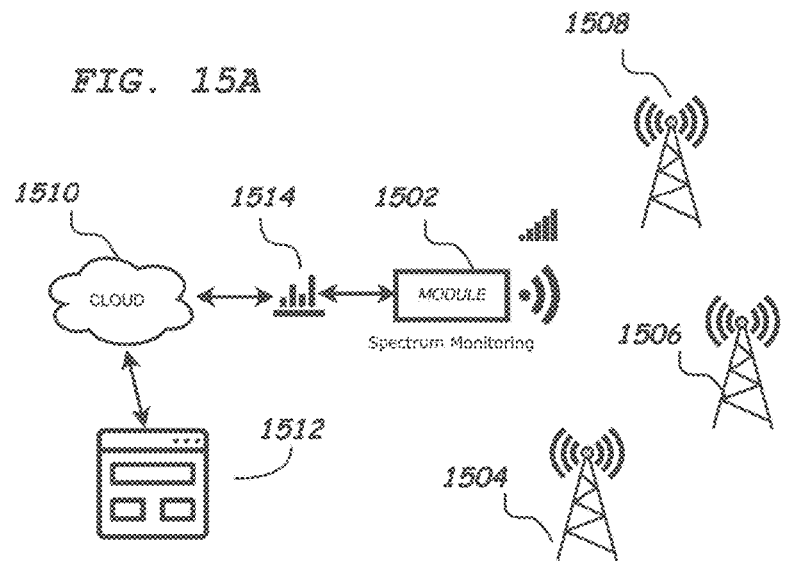
Figure 15B:
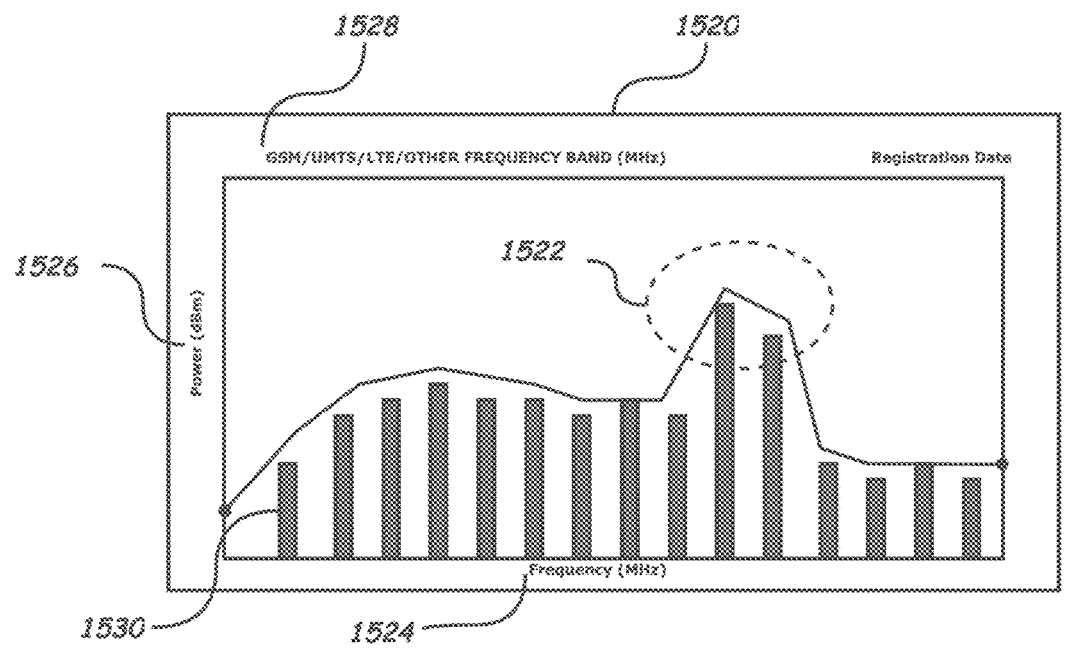

FIGS. 15A and 15B illustrate an exemplary spectrum monitoring application from an electronic device to a cloud based Sensing as a Service Platform and Web Application in accordance with one or more embodiments.

Figure 16:
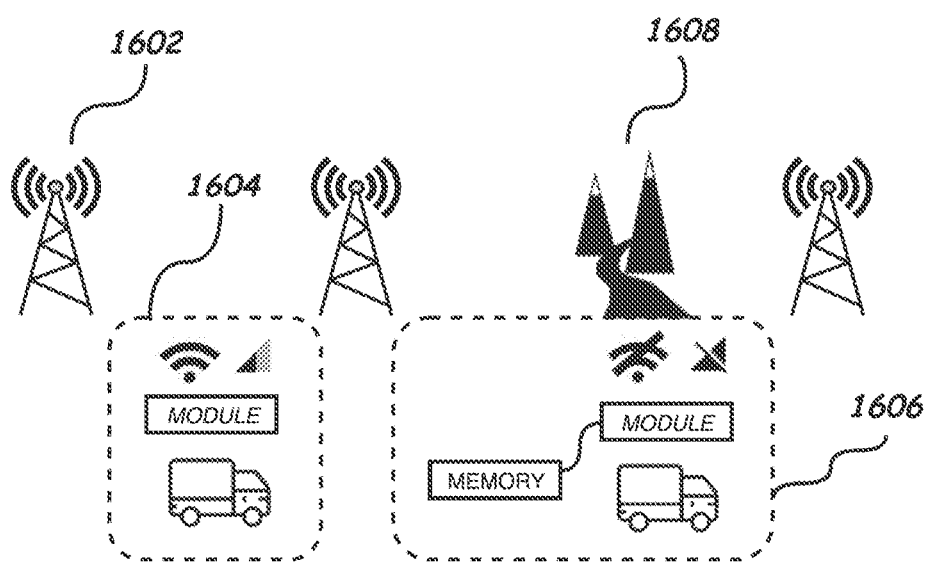

FIG. 16 illustrates an exemplary loss of connectivity scenario and management of data in areas where there is no available connectivity to cloud for a system in accordance with one or more embodiments.

Figure 17:
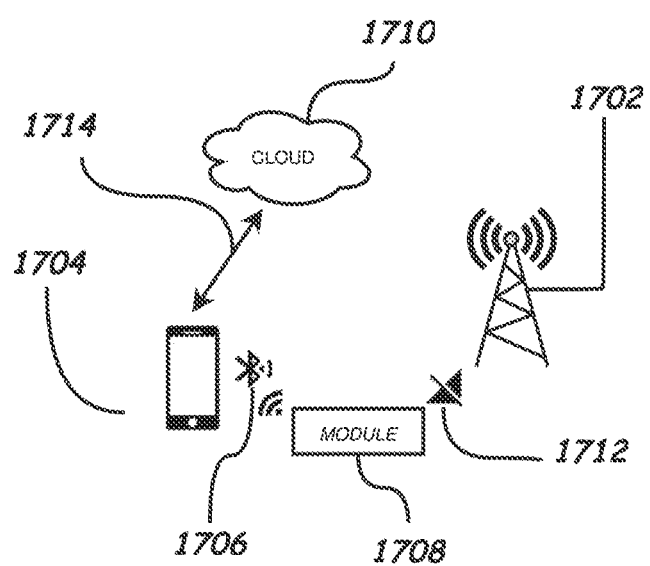

FIG. 17 illustrates an exemplary connection of an electronic device to the cloud through a combination of WPAN, WLAN, and/or WWAN enabled wireless communication in accordance with one or more embodiments.

Figure 18:
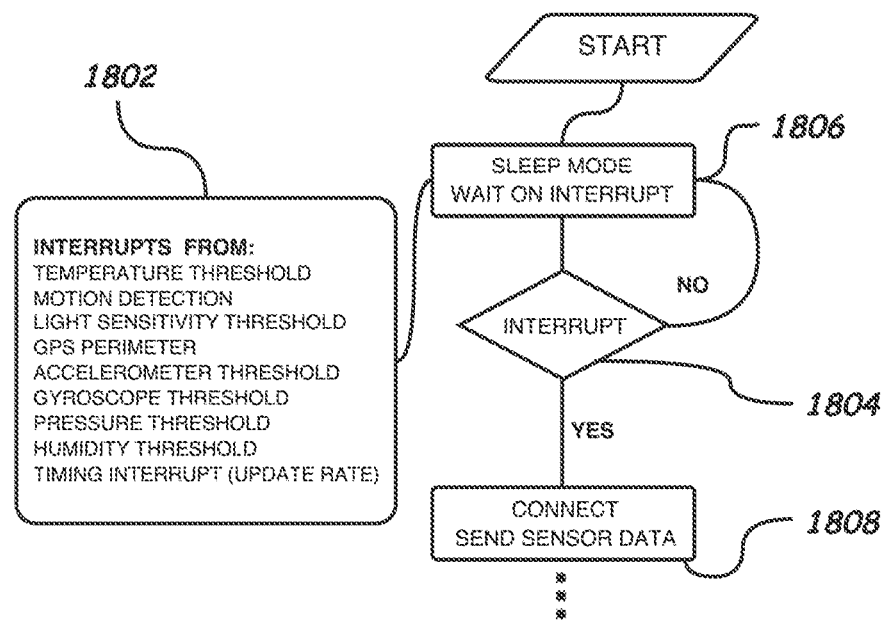

FIG. 18 is a flow chart illustrating an exemplary process for minimizing power consumption in an electronic device in accordance with one or more embodiments.

Figure 18A:
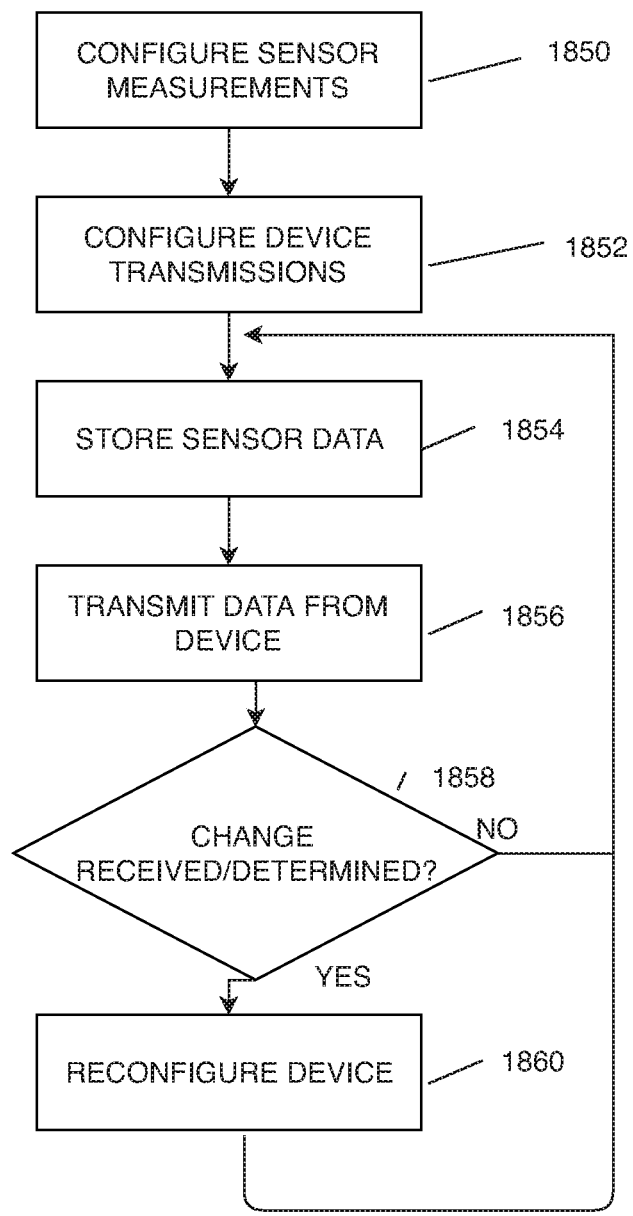

FIG. 18A is a flow diagram showing an example sequence of steps for changing a configuration of a sensor device.

Figure 18B:
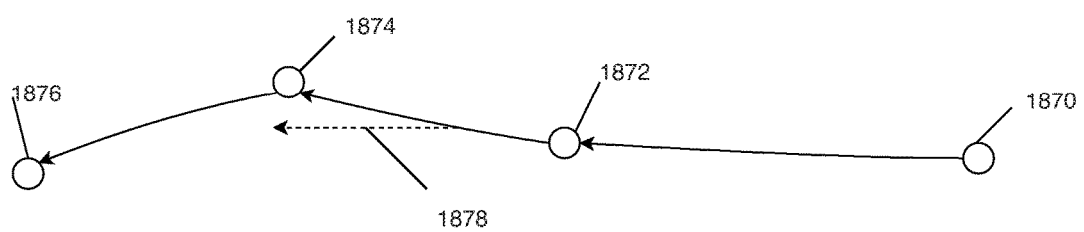

FIG. 18B is a representation of a route deviation for a sensor device.

Figure 18C:
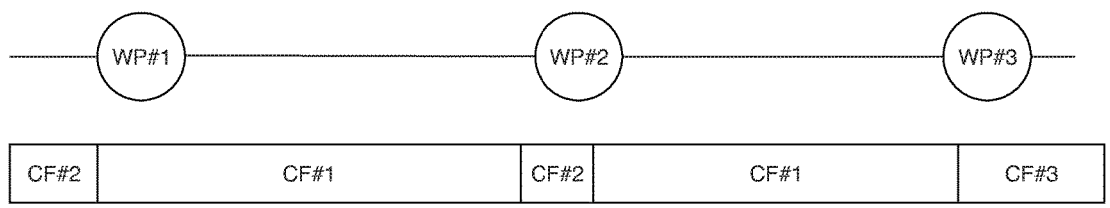

FIG. 18C is a representation showing configuration changes corresponding to waypoints for a sensor device.

FIG. 19 is a chart illustrating new features available for new LTE standards in order to support low power connectivity.

Figure 20:
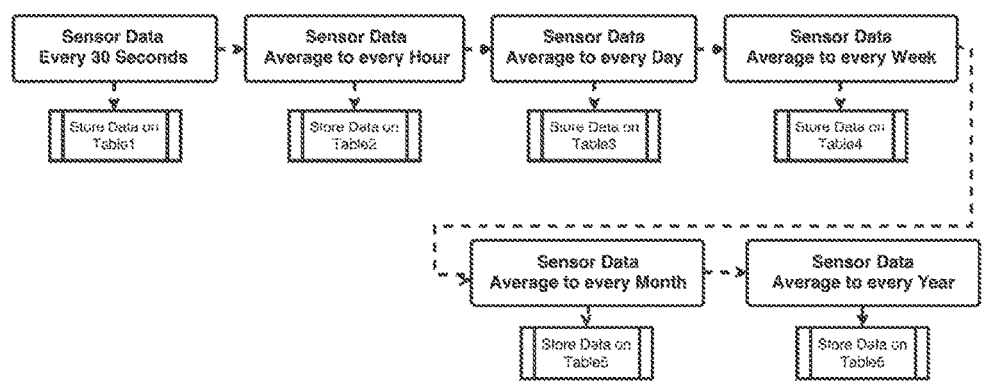

FIG. 20 is a flow diagram illustrating an exemplary mechanism of collecting and sorting data for sensors in accordance with one or more embodiments.

Figure 21:
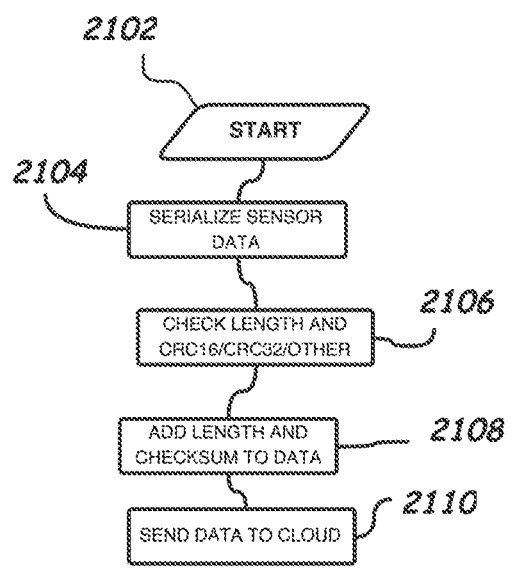

FIG. 21 is a flowchart illustrating an exemplary process to improve data verification and integrity from a device in accordance with one or more embodiments.

Figure 22:
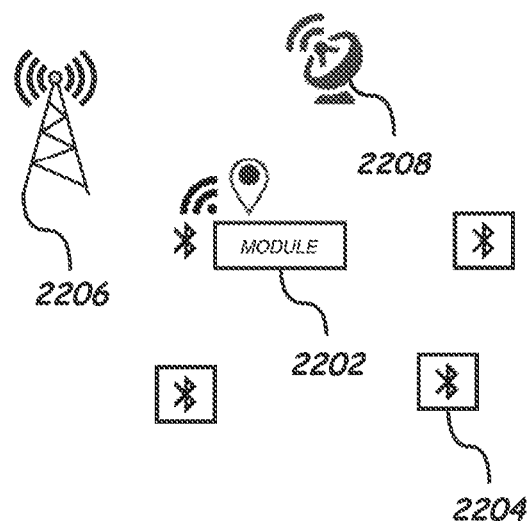

FIG. 22 illustrates an exemplary process combining GPS/GNSS, cellular location, and Wireless Personal Area Network to get an accurate location of a device depending on connectivity in accordance with one or more embodiments.

Figure 23:
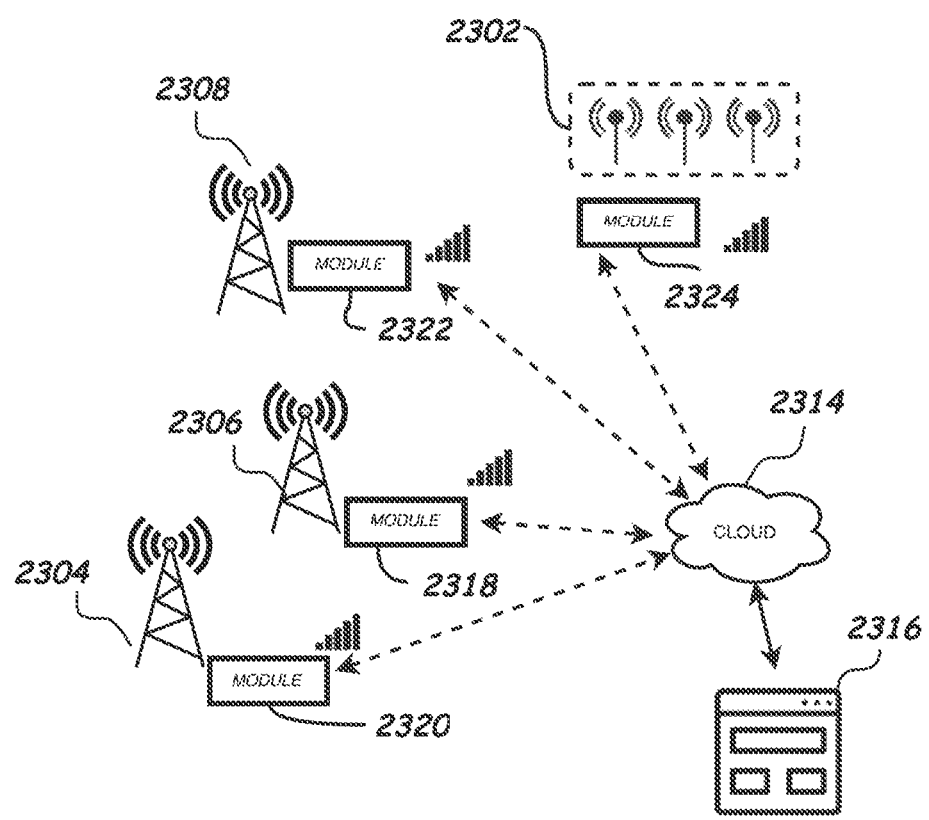

FIG. 23 illustrates an exemplary network diagnostic application in accordance with one or more embodiments.

Figure 24:
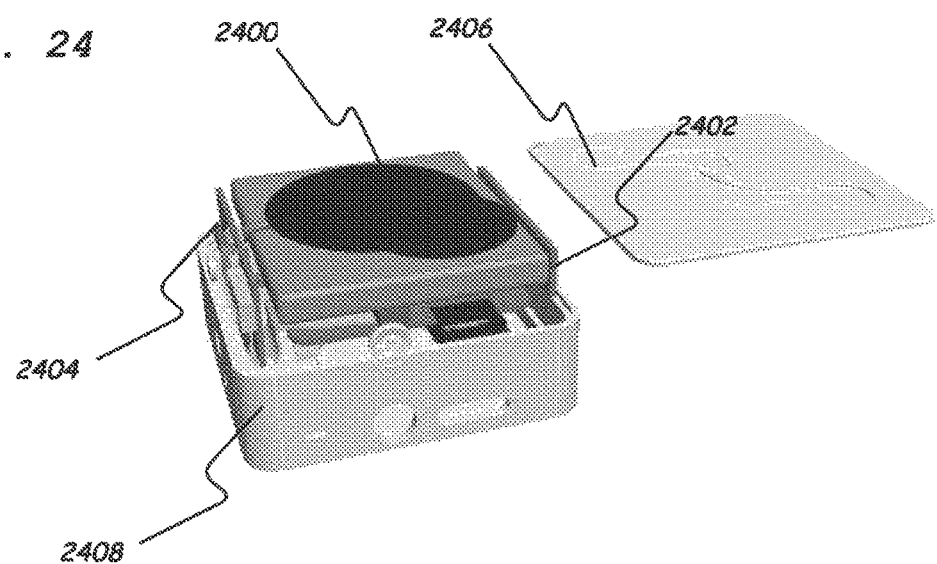

FIG. 24 is an exploded view of an exemplary electronic device in accordance with one or more embodiments showing various antenna placements for GPS/GNSS, WWAN, WPAN, and WLAN connectivity.

Figure 25:
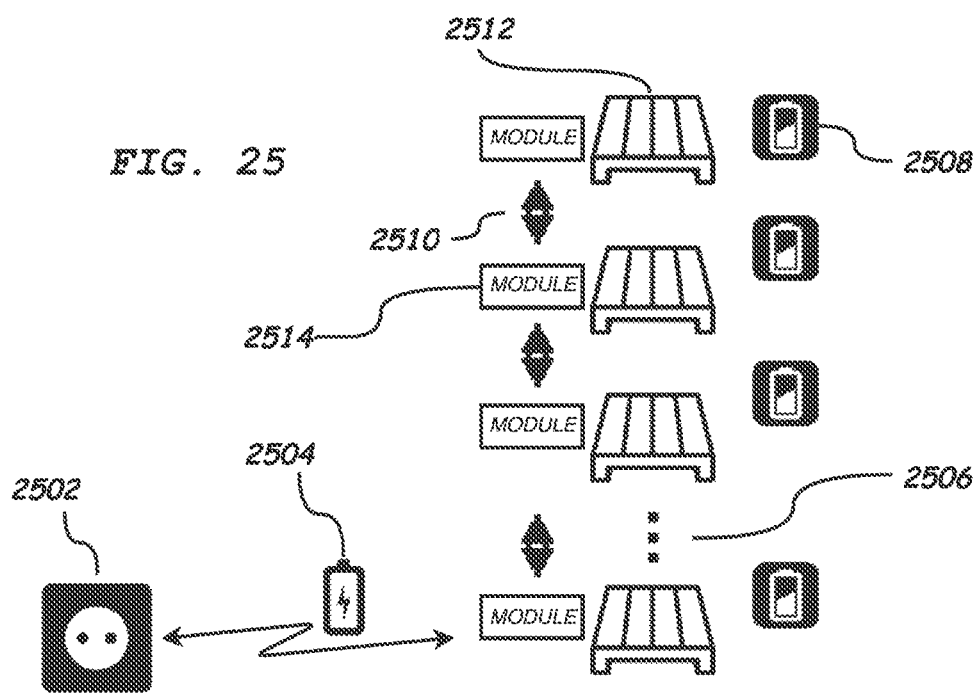

FIG. 25 illustrates an exemplary application for monitoring pallets and reusable plastic containers using an electronic device in accordance with one or more embodiments.

Figure 26:
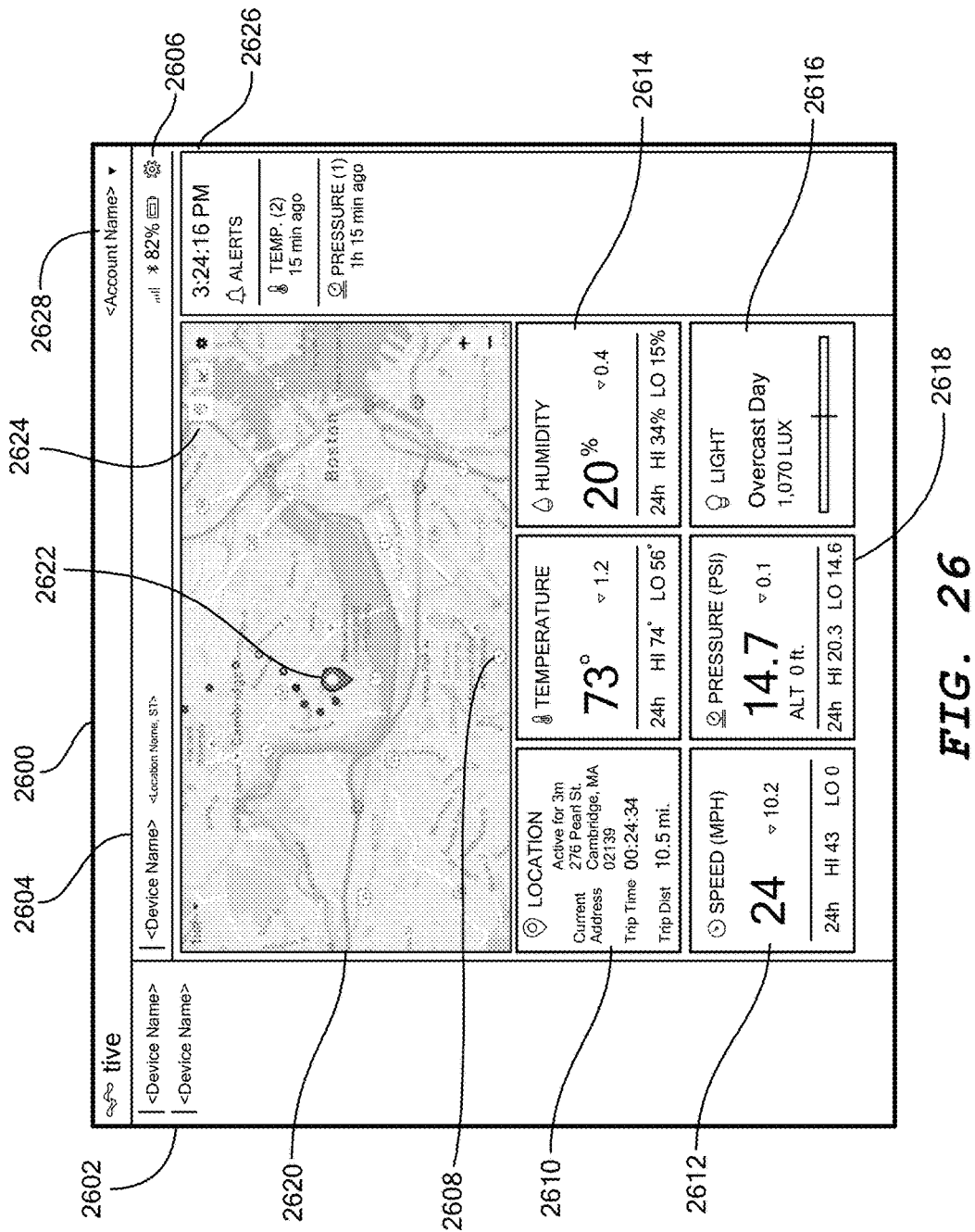

FIG. 26 is a screenshot illustrating an exemplary primary dashboard interface of Sensing as Service Platform in accordance with one or more embodiments.

FIG. 27 is a screenshot illustrating an exemplary web application settings interface in accordance with one or more embodiments.

FIG. 28 is a perspective view illustrating alternate exemplary case designs of an electronic device in accordance with one or more embodiments.

Figure 29:
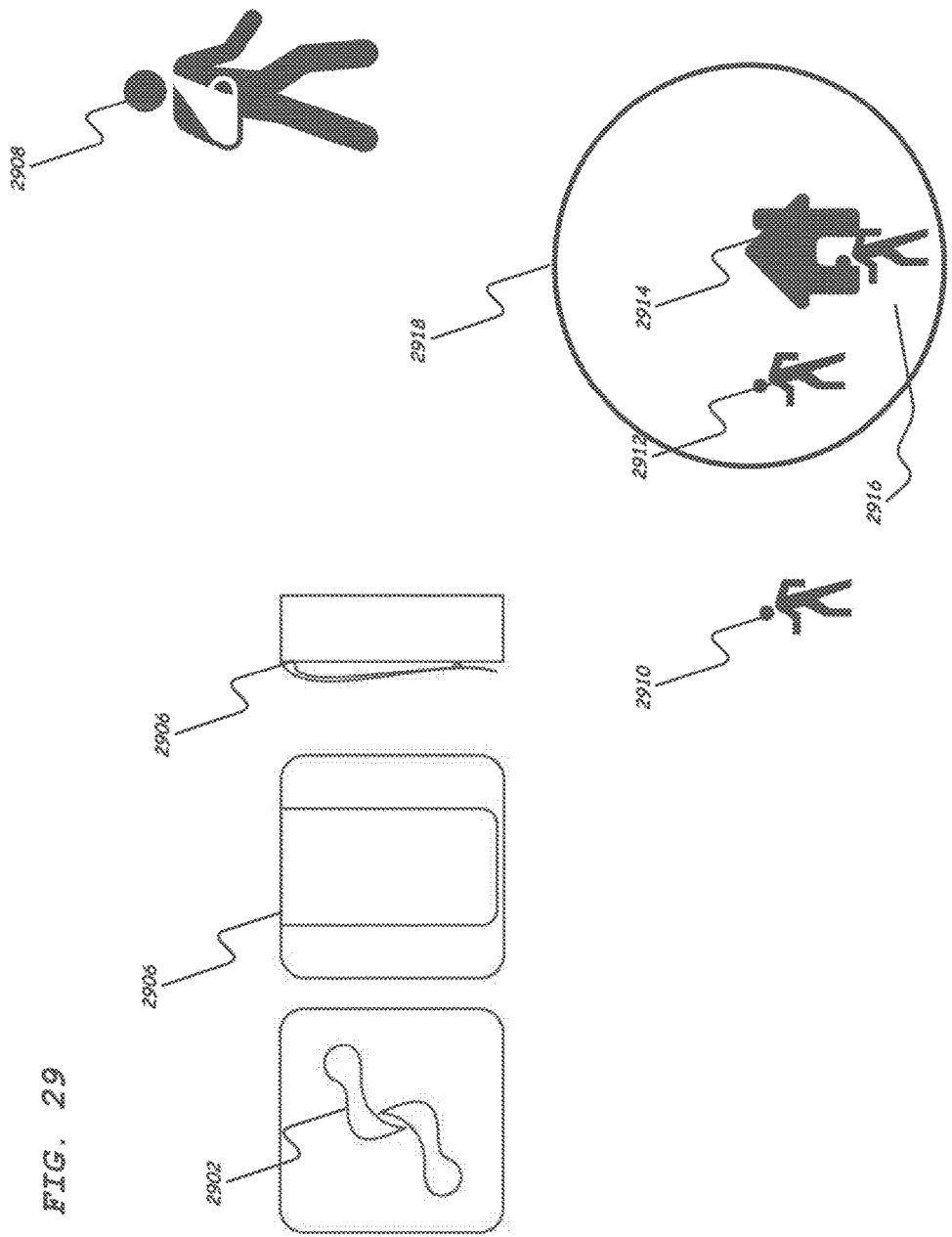

FIG. 29 illustrates an alternative exemplary case design of an electronic device in accordance with one or more embodiments.

Figure 30B:
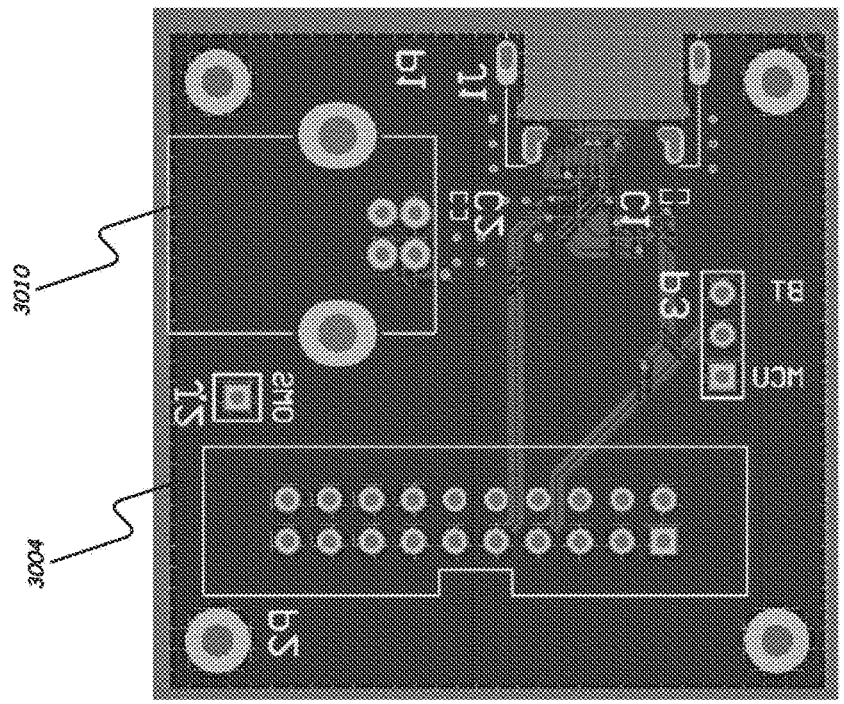
Figure 30A:
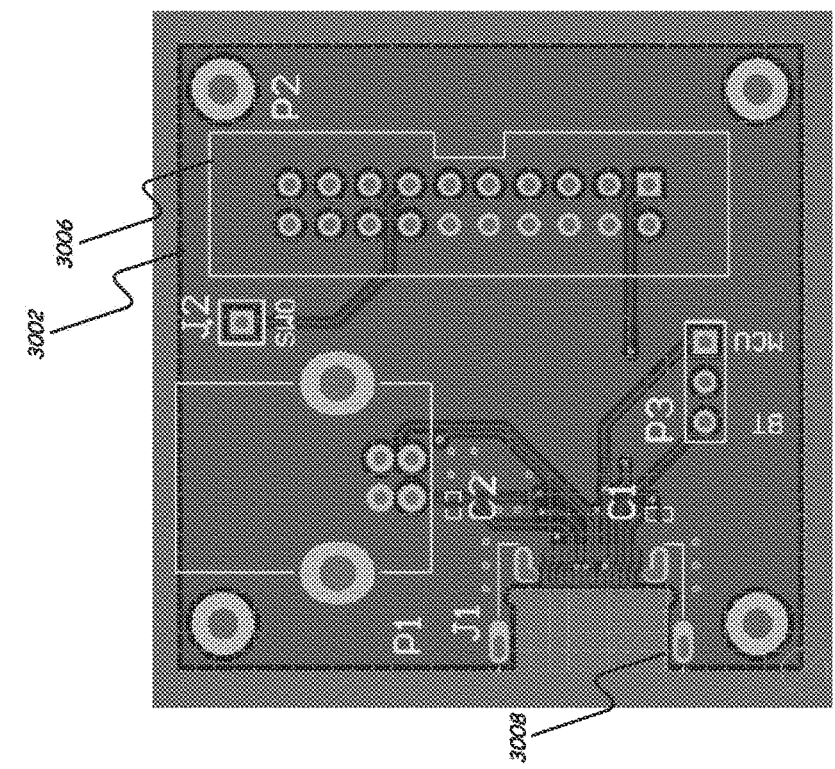

FIGS. 30A and 30B illustrate an exemplary PCB layout for an electronic device in accordance with one or more embodiments where the USB type C connector is also utilized as a MCU programmer/debugger.

Figure 31:
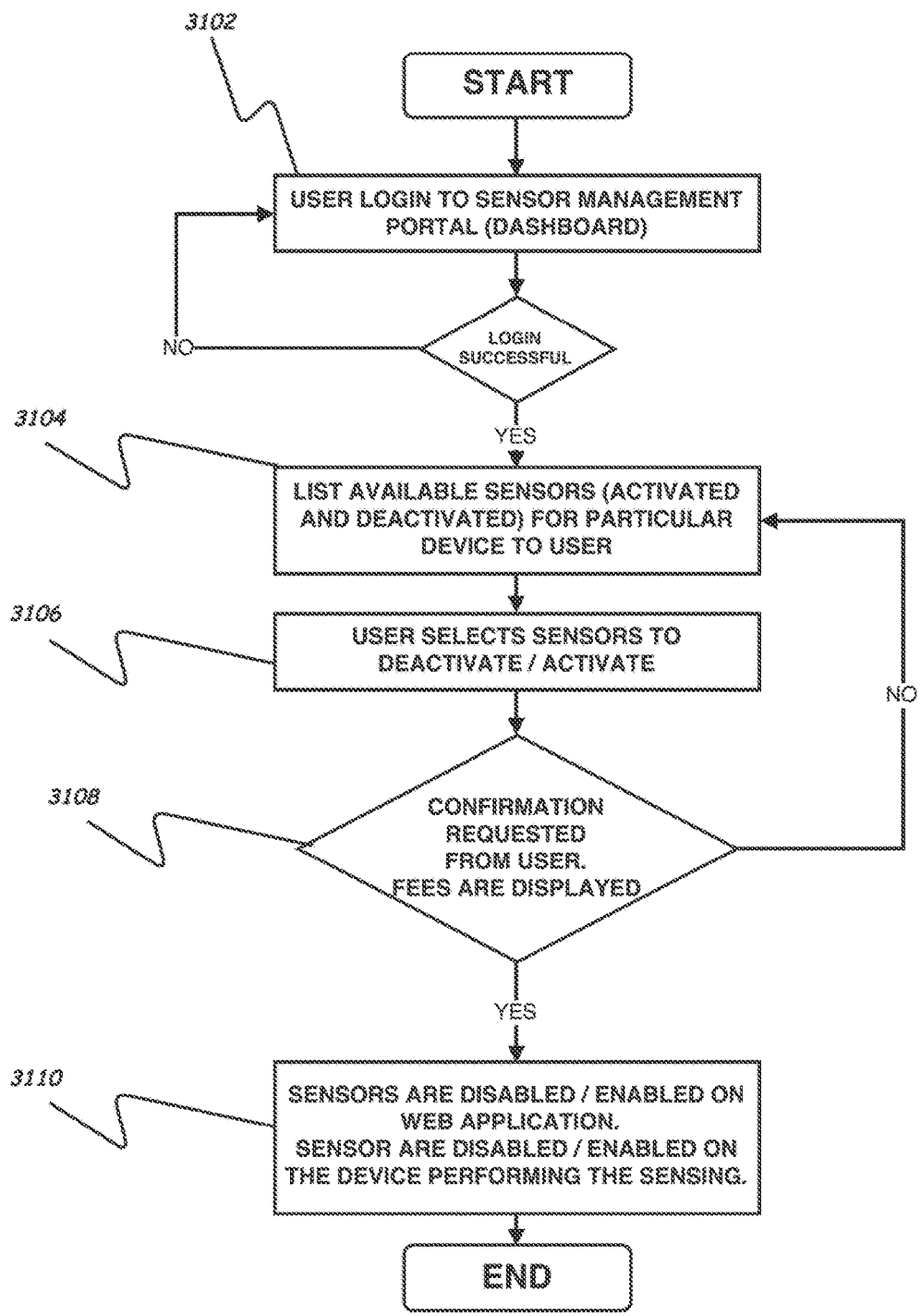

FIG. 31 is a flow chart illustrating an exemplary sensing as a service process in accordance with one or more embodiments.

Figure 32:
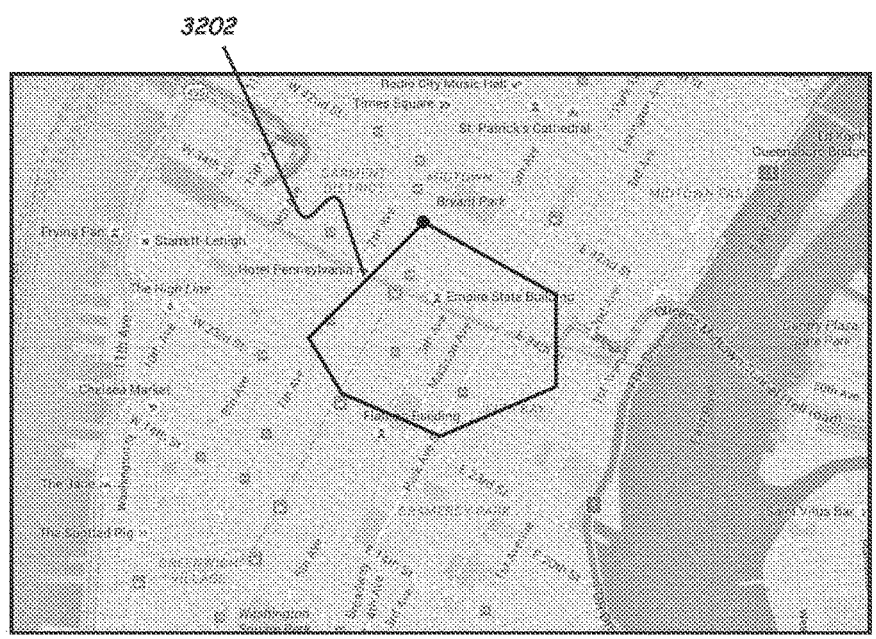

FIG. 32 is a screenshot illustrating an exemplary alert perimeter for a location sensor in accordance with one or more embodiments.

Figure 33:
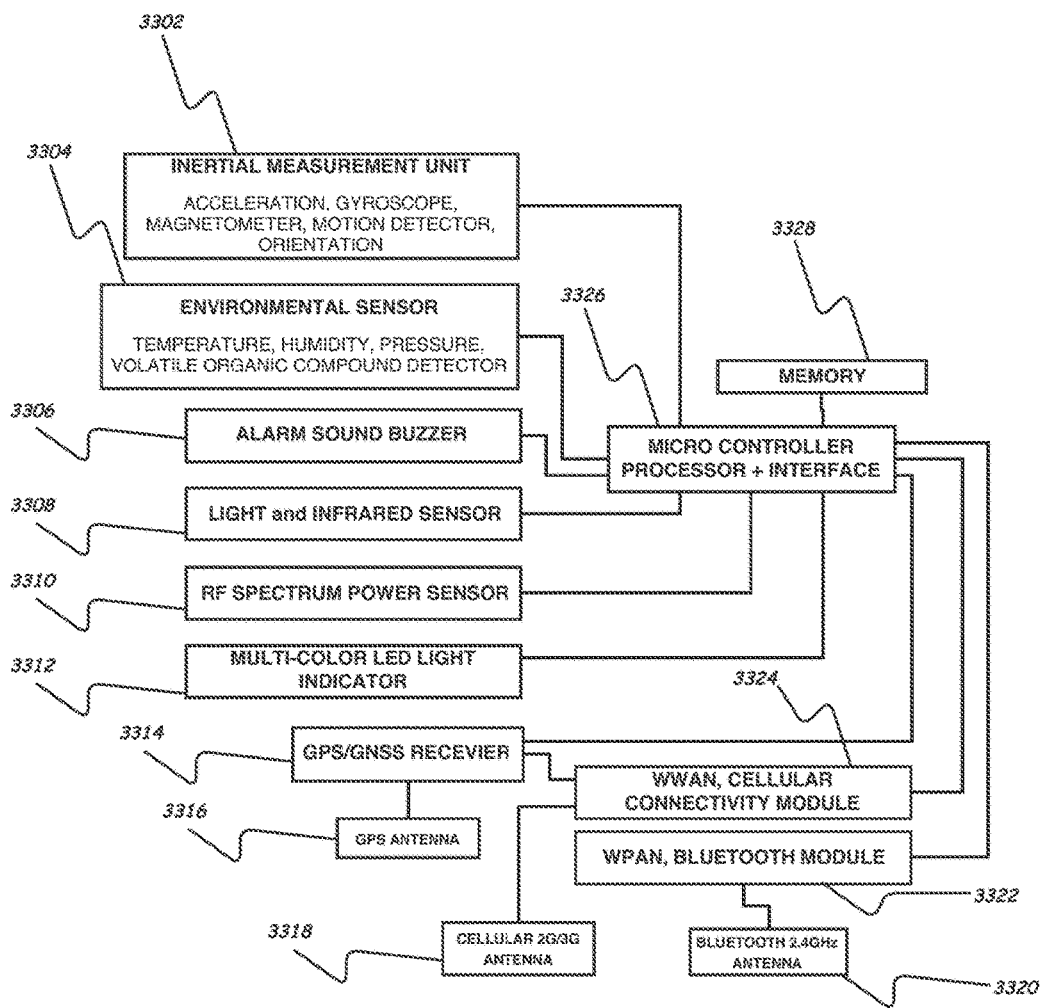

FIG. 33 is a block diagram illustrating components of an exemplary electronic device in accordance with one or more embodiments.

Figure 34:
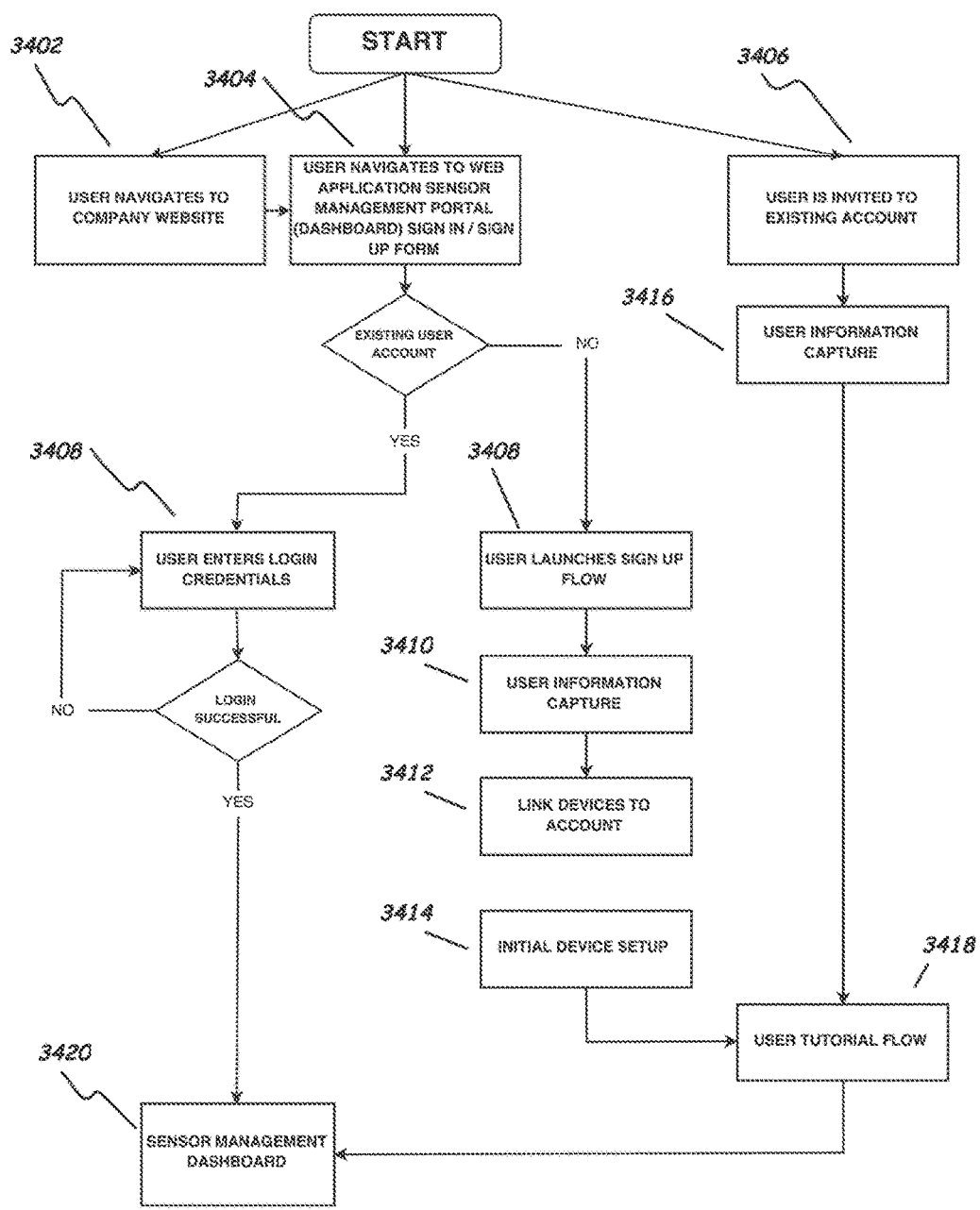

FIG. 34 is a flow chart illustrating an exemplary user sign in and sign up process in accordance with one or more embodiments.

Figure 35A:
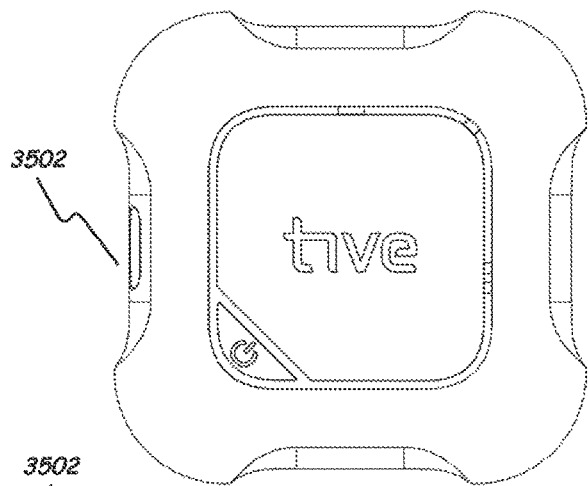
Figure 35B:
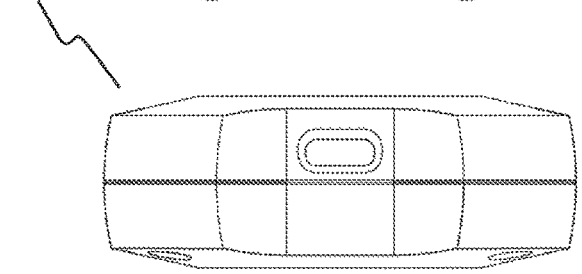

FIGS. 35A and 35B are top and front views, respectively, of an alternative exemplary case design for a device in accordance with one or more embodiments.

Figure 35C:
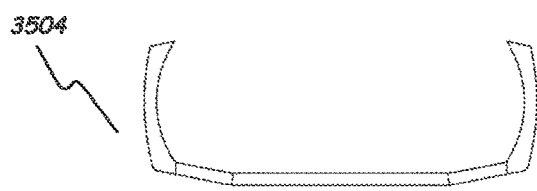
Figure 35D:
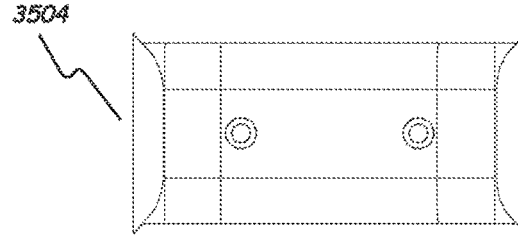

FIGS. 35C and 35D are side and top views, respectively, of a clip that can be removably attached to the case of FIGS. 35A and 35B to secure the device to an asset in accordance with one or more embodiments.

DETAILED DESCRIPTION

Various embodiments disclosed herein relate to electronic devices with multiple sensors that can report the various sensor readings and measurements relating to an asset using wireless connectivity to a remote computer system operating a sensing as a service platform and a web application. The devices can be used to monitor, track, or trace a variety of assets including, but not limited to, packages, pallets, containers, animals, and people.

The sensor devices can communicate using various wireless communication protocols, and reference throughout the specification to wireless communication can include communication protocols and methods other than those used to illustrate the exemplary embodiments described herein.

The term sensor as used herein broadly refers to generally any type of sensor that is capable of monitoring ambient or device state characteristics. Such sensors include, but are not limited to, sensors for temperature, humidity, pressure, volatile organic compound (VOC) detection, ambient light sensing, infrared sensing, accelerometer, magnetometer, gyroscope, GPS/GNSS receiver, radio frequency (RF) spectrum power sensing.

Reference herein to a remote computer system or to the cloud can include a variety of database architectures, data centers, remote servers or machines, remote APIs, and the internet in general.

Measuring and sensing various environmental conditions and states has moved the market and technological innovation toward miniaturization of many sensors and connectivity modules. The movement has been mainly led by mobile computing devices such as smartphones, tablets, and others which typically include electronic sensors such as: ambient light sensors, GPS/GNSS receivers, accelerometers, gyroscopes, and magnetic field sensors (magnetometers). However, smartphones that are available today do not contain environmental sensing and monitoring capabilities. The advantage that smartphones have is their capability to connect to the Wireless Wide Area Network (cellular network or others), the Wireless Local Area Network (WLAN), such as WiFi, and Wireless Personal Area Network (WPAN), such as Bluetooth, Bluetooth Low Energy (BLE), or Bluetooth Smart. Smartphones are designed to stream a great deal of data from and to the internet, with battery lifetimes ranging from 6 to 12 hours. Such a limited battery lifetime is not sufficient for sensing applications in which minimal or no recharging is required by the end user. This smartphone advantage, however, comes at cost, such as the high price of smartphones with power hungry processors, not being able to effectively sense environmental conditions such as humidity temperature pressure, and others, and requirements by their users to sign complicated contracts and pay large costs for various data plans to cellular network operators.

Figure 1A:
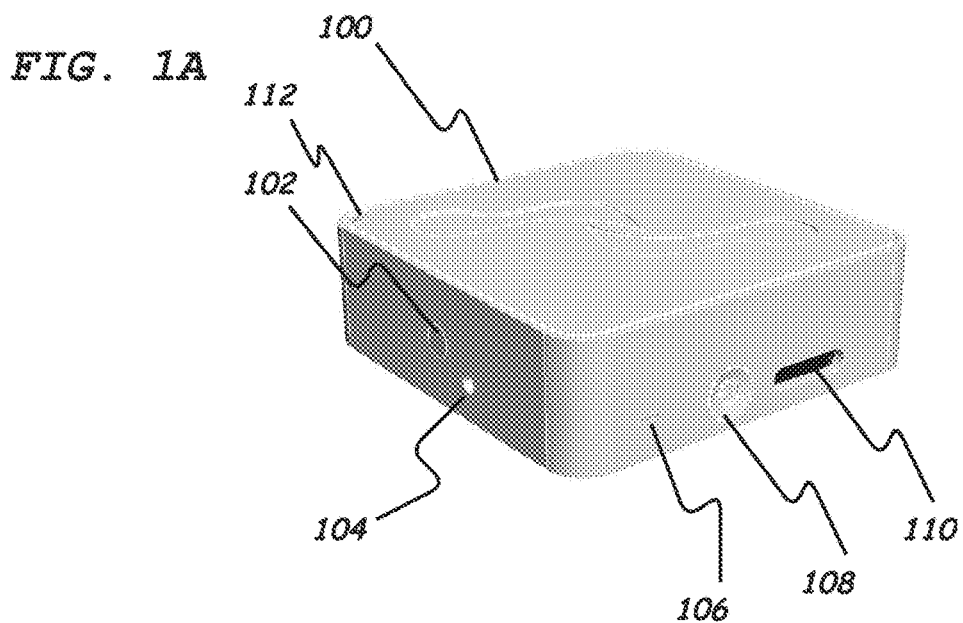
FIG. 1A is a perspective view of an exemplary electronic multi sensor device in accordance with one or more embodiments.

FIG. 1A illustrates an exemplary multi sensor electronic device 100 in accordance with one or more embodiments. The device 100 has an outer case with a power button 108, which is used to turn on and off the device 100. The power button 108 can also be used to check the battery life of the device by pressing the button for a short time (e.g., less than a second). In one or more embodiments, a single multi-color (red, green, and blue) LED light 102 is used to indicate the status and the states of the device. The functionalities that the notification LED 102 can show include: battery power, cellular connectivity, GPS/GNSS connectivity, WPAN/WWAN connectivity, various malfunctions, an OK (all good) status, and other features of the device. The blinking of the LED 102 and its colors can be programmed to indicate these features and various other notifications. The power button 108 pushing sequence and pushing length can also be programmed such that these various states of the device can be checked, or device actions can be performed.

The type C USB port (or other port such as, e.g., a mini or micro port) 110 is a multi-function port that can be used for one or more of the following: (1) for charging the battery, (2) to connect an external battery and extend the operation of the device, (3) to power the device where the LED 106 would light up, (4) to configure the device and update the firmware, and (5) to send other data such as sensor data through USB 110. This USB can also be utilized to communicate using other protocols with an adapter for UART/SPI/I2C or others and then sending data using those other protocols. In addition, the USB port can be used to connect two or more devices together so that they can share data between their sensors, processors, and/or their modules and utilize each other's wireless communication capabilities. There are multiple sensors placed on the device and some embodiments involve sensing of environmental conditions, ambient light, and/or infrared light. In order to perform these functions, the device utilizes sensors that measure: temperature, humidity, pressure, and light, which sensors are not encapsulated inside the device's case. In one embodiment, an opening window 104 is provided enabling air flow and light to enter the device case. The general-purpose hole or lanyard hole 112 can be used for attaching the device to keys, bags, cars, and other things.

Figure 1B:
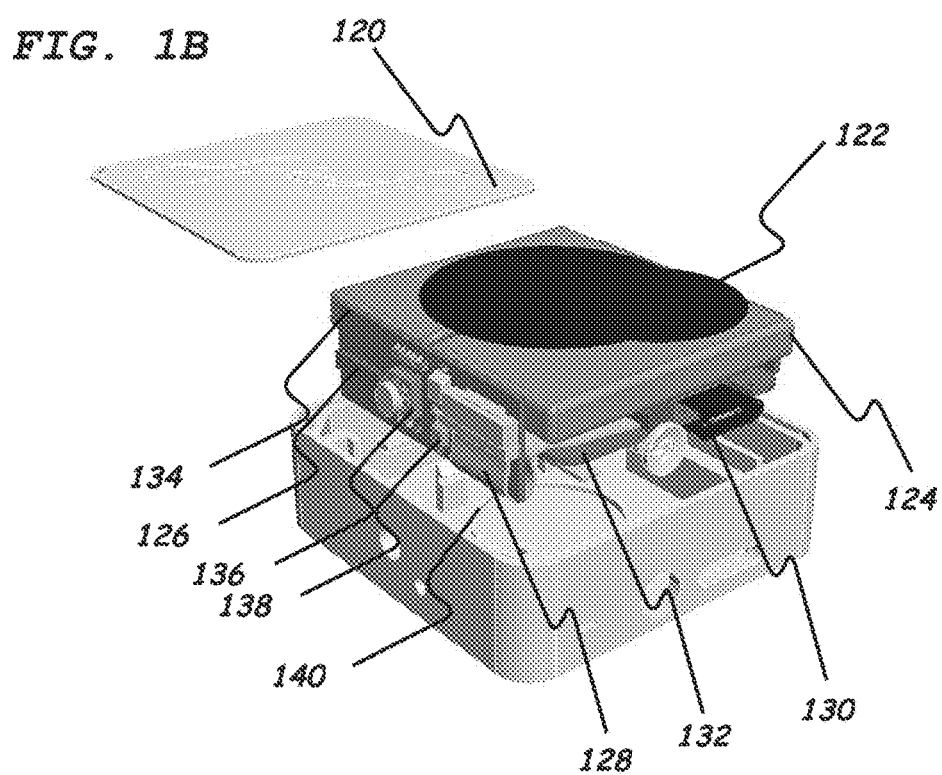
FIG. 1B is an exploded view of the FIG. 1A device.

FIG. 1B illustrates an exploded view of the electronic device 100 where various internal parts are shown in more detail. The case cover 120 contains a logo and also the lanyard hole 112. The device includes a GPS/GNSS antenna 122, which can be a flexible omnidirectional antenna. The battery 124 is placed on the device and it could be smaller or larger than the one shown in the figure. The device includes a Bluetooth or WiFi antenna, which is preferably a chip antenna 126 to take least amount of space. The type C USB connector 130 for recharging the battery is also used to program the micro controller. The main PCB 132 and the side PCB 134 of the device are connected using a ribbon type cable 128. The side PCB 134 also contains a light sensor 136 and the temperature/humidity/pressure/volatile organic compound (VOC) sensor 138. The device includes an alarm buzzer placed in the circle shaped space 140 for a good fit of the buzzer. A double-sided tape or other adhesive can be used to attach the buzzer to the case such that it can cause vibrations and sound can be emitted out of the device.

Figure 1C:
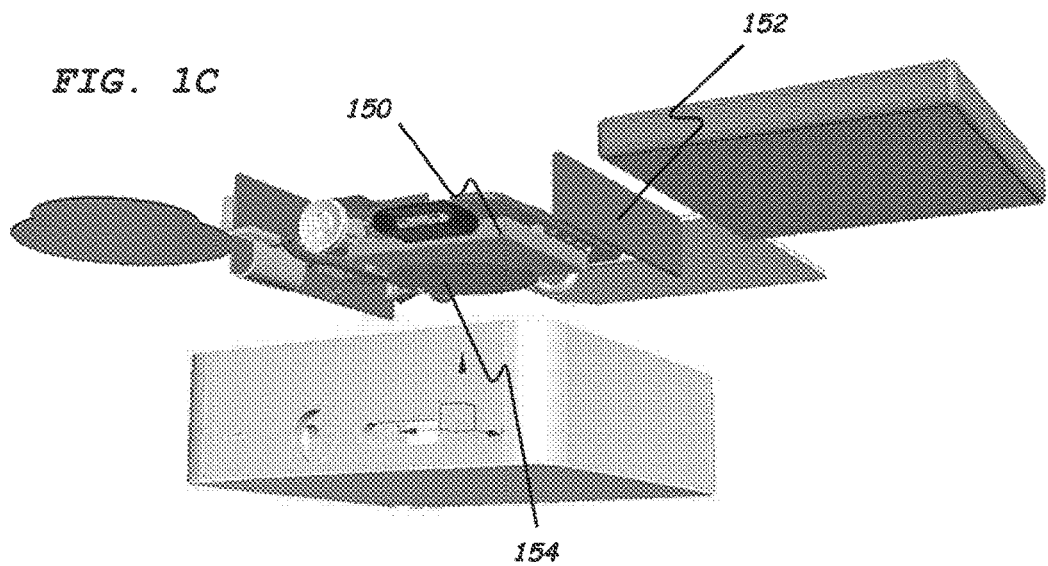
FIG. 1C is another exploded view of the FIG. 1A device.

FIG. 1C illustrates another angle of the device showing a 2G/3G/4G antenna as a PCB antenna 152, the buzzer 154, and a cellular module 150. The antennas can be designed for world-wide coverage.

Figure 1D:
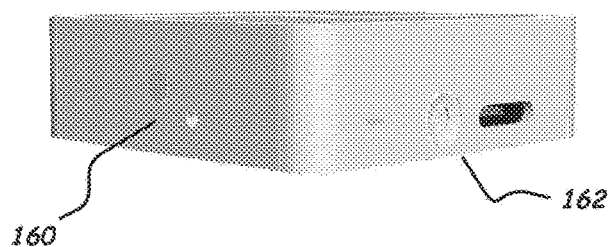
FIG. 1D is another perspective view of the FIG. 1A device.

FIG. 1D shows the device from a perspective in which LED 160 and power button 162 are both visible. Power button 162 is used to switch the device on or off, check status, and push data to the cloud. Each of these actions is accomplished by different inputs using the power button and results in an output from the LED 160, in the form of either red, green or blue light combination. Each of these actions, with their required inputs and LED outputs are outlined in FIG. 1E.

The electronic devices described in accordance with the various embodiments disclosed herein can be the same as or similar to the device 100 of FIG. 1A.

Figure 2:
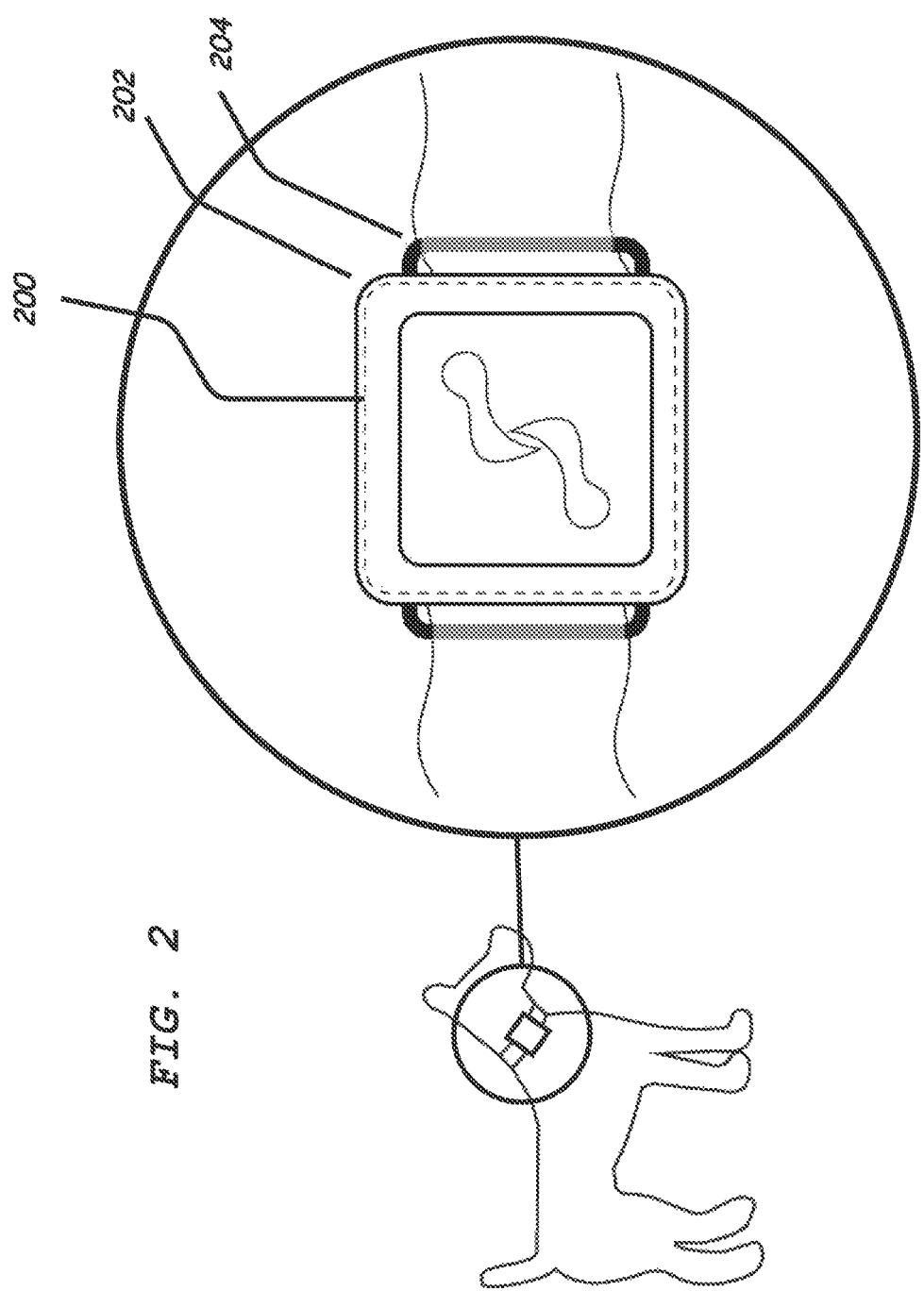
FIG. 2 illustrates an exemplary application for an electronic device with an adjustable strap in accordance with one or more embodiments.

FIG. 2 shows an electronic device 200 in accordance with one or more embodiments enclosed in a case 202. The case is preferably manufactured using high durability silicone, and is malleable to insert the device into the front opening. When enclosed, the entire device and case have increased water resistance. Built-in case loops 204 provide securement points for adjustable collars of multiple sizes depending on the application.

FIGS. 3A and 3B show the opposite top and bottom sides of an exemplary PCB layout for an electronic device in accordance with one or more embodiments with WWAN connectivity and multiple sensors on board in accordance with one or more embodiments. In one embodiment a small size PCB 302 at 40.times.40 mm is used containing WWAN connectivity module, a temperature sensor, a humidity sensor, a pressure sensor, an inertial measurement unit sensor, an alarm buzzer, and an on board PCB antenna 304 to meet 2G/3G requirements.

FIGS. 3C and 3D show an exemplary PCB layout (top and bottom views of the PCB) for an electronic device in accordance with one or more embodiments where two PCBs are shown in accordance with some embodiments. The PCB sides 312, 314 show the top side of the 4-layer PCB, whereas the PCB sides 310, 316 show the bottom side of the 4-layer board. This shows the version of the overall PCB that is purposefully built for manufacturing, the PCB 316 can snap off from PCB 310. In one embodiment the PCB 316 is the WPAN connectivity module, in this multi-color LED indicator.

Figure 3F:
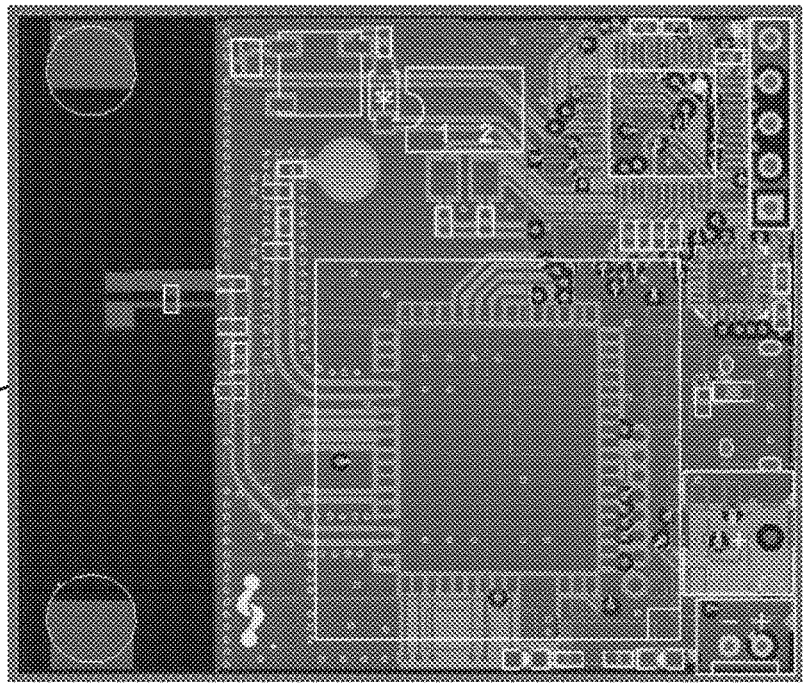
FIGS. 3E and 3F illustrates an exemplary PCB layout for an electronic device with a surface mount WWAN antenna in accordance with some embodiments.
Figure 3E:
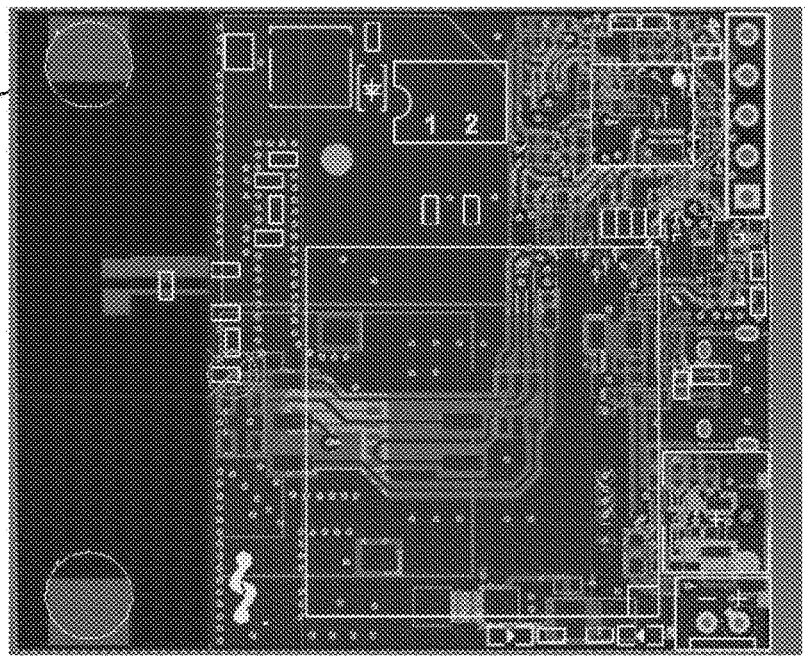

FIGS. 3E and 3F show an embodiment of a PCB layout (top and bottom views of the PCB) for an electronic device with a surface mount WWAN antenna in accordance with some embodiments. This device contains the same configuration as shown in FIGS. 3C and 3D. Reference numbers 322 and 324 indicate the opposite top and bottom sides of the PCB that uses a surface mount antenna (not a PCB trace antenna as in FIGS. 3A and 3B).

Figure 4:
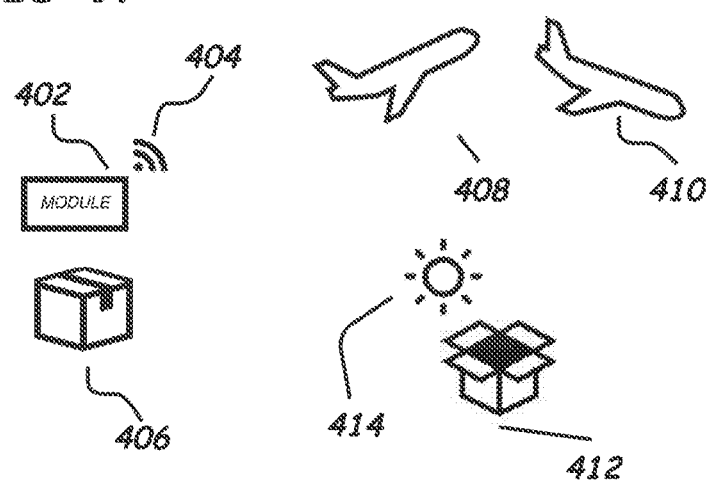
FIG. 4 illustrates an exemplary asset tracking process in accordance with one or more embodiments.

FIG. 4 shows an exemplary asset tracking application using the device 402 in accordance with one or more embodiments. The device is used to track and trace packages 406 during transportation in this example. In one embodiment, the multi-sensor electronic device with wireless connectivity can be utilized to track/monitor the location, temperature, humidity, pressure, presence of VOCs, motion, handling, and see if the package has been opened by interpreting data from an ambient light sensor or a proximity sensor. The update rates for each measurement can be modified remotely and can be programmed to connect to the cloud every 30 seconds, 1 minute, 5 minutes, 10 minutes, 30 minutes, 60 minutes, 6 hours, continuously, or any other time interval that is desired for monitoring of the package during shipment.

The tracking of the package can be visualized from its source to its destination. The pressure sensor and the accelerometer on the device can be used to determine the shipping method: ground or air. If the package is being transported by ground the pressure sensor will sense a certain range of pressure values that correspond with measurements of less than a few thousand feet above sea level and accelerometer readings that can correlate to accelerometer reading produced by an automobile. If the package is being transported by air, the pressure sensor will detect pressures that are greater than 10,000 feet above sea level, and sense accelerations within in a time period that can only be produced by an aircraft during takeoff 408 or landing 410. This mechanism can also be used to remotely turn off all radios on the device to comply with FAA or other flight regulations. Turning off the radio causes the device to stop sending sensor measurement data to the cloud. However, the device continuously monitors the status of the package and stores the readings in its memory. The advantage of the device is that it has an external memory that communicates to the micro-controller and it can store all sensor data with timestamps during transportation of the package. Once connectivity conditions are met, the WWAN, WLAN, or WPAN radios are turned on to establish connectivity to the cloud and transfer the data based on the available wireless connections to the cloud.

Devices In accordance with various embodiments can be operated in various other configurations. For instance, in one example, the device can be configured to stay in sleep mode until there is a movement of the package detected by analyzing the accelerometer sensor data. Once the movement is detected the package can be tracked and traced continuously for a certain amount of time, or indefinitely until it runs out of battery power depending on the setup by the end user. This feature could allow the device to operate longer and save on its battery power. In another example, the device can be configured to be in sleep mode and only wake up once there is a change detected by the ambient light sensor. Such as package being opened 412, or any other scenario where the ambient light sensor can change due to light 414 exposures. In a further example, the device is configured to continuously track temperature or humidity and it can bet setup to send an alert once a particular threshold is reached, enabling the safe and efficient transportation of items that are sensitive to temperature or humidity. In another example, the device is configured to monitor how the package has been handled by using the accelerometer sensor. For example, if a fragile package is thrown, tossed or moved in an undesired fashion during shipment, this data can be stored and reported back to the cloud. This can also apply for the orientation of the shipment as there are shipments that require particular orientation during transportation, such as refrigerators, stoves, and other appliances. The device can be attached inside the box used to transport these items and the orientation can be tracked and recorded in real-time.

Figure 5:
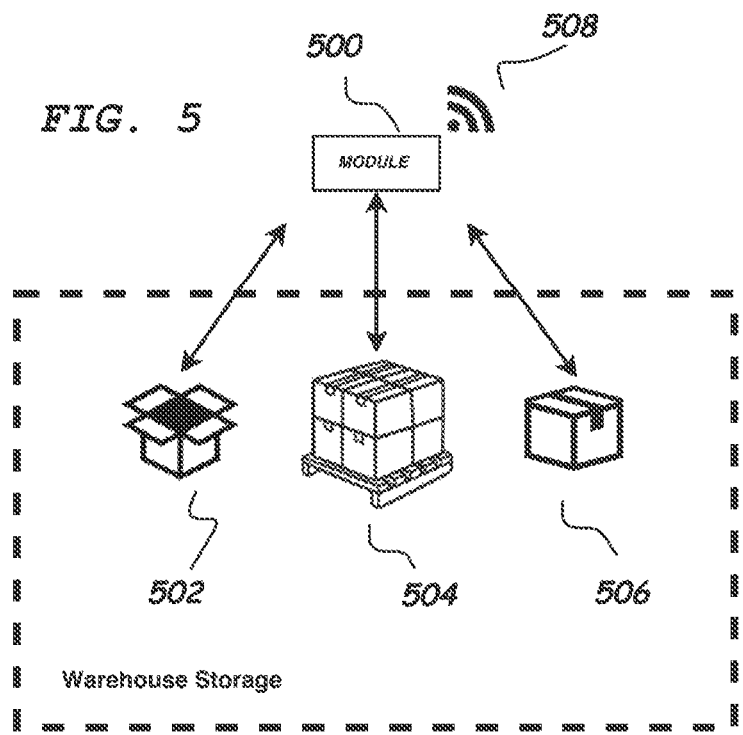
FIG. 5 illustrates an exemplary tamper-proof tracking application in accordance with one or more embodiments.

FIG. 5 illustrates an exemplary motion detection application in accordance with one or more embodiments. In this example, there are various items stored in a warehouse (location) 510 where they are supposed to be stored for multiple days or weeks and not be tampered with. For these types of applications, the device 500 can be placed inside a pallet 504, boxes 506, parcels 502, or other assets in a warehouse (other facilities). The device then can be programmed to stay in sleep mode until there is an actual motion detected by the accelerometer or gyroscope motion detector chipset. This motion can lead to the device waking up and sending a signal to the cloud and informing the end user that there has been tampering on the asset or item at which the device was placed in.

In another illustrative embodiment, the device 500 is placed in one of the assets shown below it: a package 502, a pallet 504, or any other asset 506. The assets are inside a warehouse, but they could be anywhere where tampering of the assets is not permitted for a certain period of time. In this case the device 500 is configured such that the majority of time is kept in sleep mode and once motion is detected it wakes up and utilizes the WPAN, WLAN, or WWAN connectivity 508 to send information to the cloud about the whereabouts of the device, using GPS/GNSS based location, cellular based location and also send additional information regarding the motion detection due to tampering of the tracked device and the abrupt changes on the accelerometer or gyroscope readings.

Figure 6:
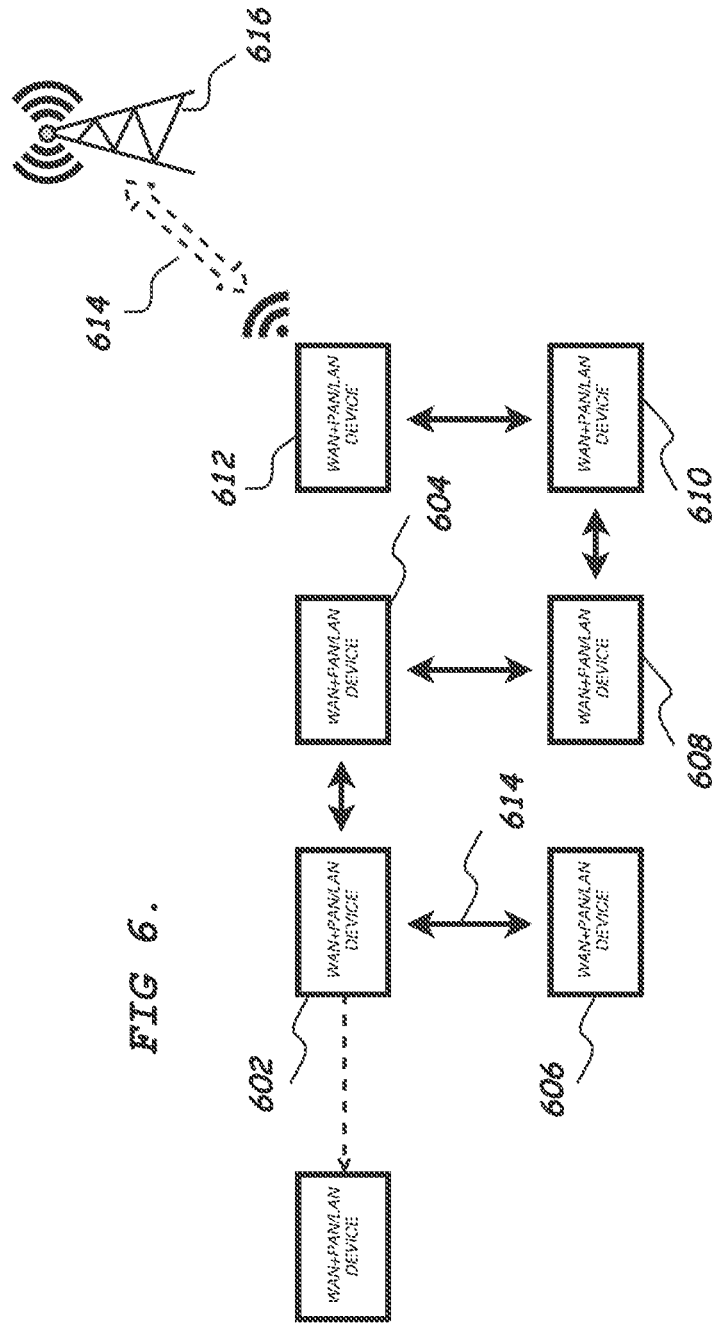
FIG. 6 illustrates an exemplary mesh-network configuration for multiple electronic devices in accordance with one or more embodiments.

FIG. 6 shows an exemplary mesh network application in accordance with one or more embodiments with a combination of personal and Wireless Wide Area Network modules and chipsets. In one or more embodiments, a mesh network between the devices 602, 604, 606, 608, 610, and 612 is created using either USB connection or Wireless Personal Area Network (WPAN) connectivity such as Bluetooth, Bluetooth Low Energy, Bluetooth Smart, ZigBee, Z-Wave, or other low power wireless communication protocols. In this scenario, even though all of the devices (two or more) have WWAN 614 connectivity such as cellular, LoRa, Sigfox, or others, one of the devices is assigned to be the master (or designated device) to connect through WWAN 614 such as shown in FIG. 6 where only device 612 is connected to the WWAN.

In another embodiment the device containing WWAN+ WPAN+WLAN, WWAN+WPAN, or WWAN+WLAN connectivity combinations could be utilized for best power consumption. In one or more embodiments, six devices 602, 604, 606, 608, 610, 612 are shown. Initially, device 612 is connected to WWAN, and the device 612 will remain connected to the WWAN network for as long as the battery of the device reaches a certain percentage, such as 20%, 30% or any other percentage threshold. All the sensor readings from the other devices will be transferred to the WWAN connected device 612 through WPAN or WLAN through mesh or direct transfer method. Once that battery threshold is reached, the WWAN connectivity is turned off at the device 612 and WWAN of the next device 610 is utilized, and this continues with all other consecutive devices until the batteries of all devices are fully consumed as WWAN connectivity is a power hungry module when compared with the other modules inside the electronic device. The data flow in this example goes from device 612 to 610 through WPAN or WLAN connection, and 610 then sends the received data to the cloud through its WWAN connectivity.

Figure 6A:
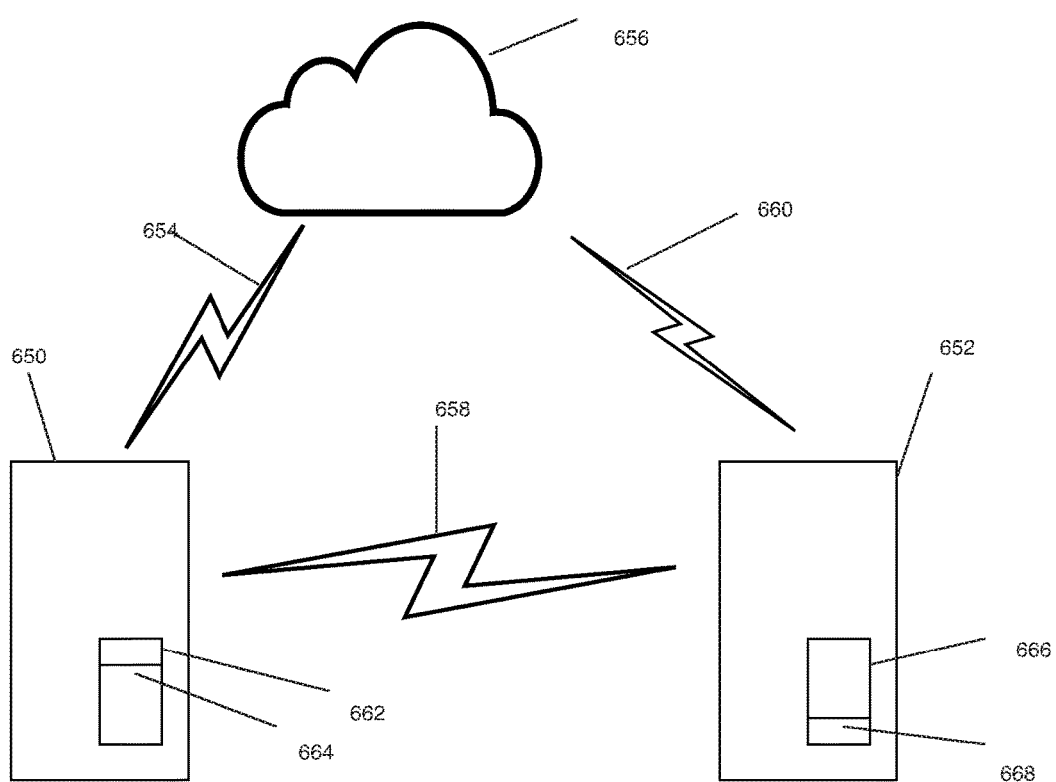
FIG. 6A is a schematic representation of an example system having multiple sensor devices in communication with each other for pooled battery usage.

FIG. 6A shows a first sensor device 650 (e.g., device #1) and a second sensor device 652 (e.g., device #2). In embodiments, the first and seconds sensor devices 650, 652 have sensors and connectivity as described above. In the illustrated embodiment, the first device 650 is connected 654 to the cloud 656, such as by a cellular link, and to the second device 652, such as by a BLUETOOTH link 658. The second device 652 may be connected to the cloud 656 via a link 660.

The first sensor device 650 includes a battery 662 having a battery level 664. Similarly, the second sensor device 652 also includes a battery 666 having a battery level 668. The first and second sensor devices 650, 652 can pool their battery power to conserve power and efficiently transmit information to the cloud and to each other.

For example, the first and second devices 650, 652 have high-power connectivity, e.g., cellular links 654, 660, and low-power connectivity, e.g., BLUETOOTH links 658, that enable device interaction in order to increase the battery life of the overall system. Assume that the first device 650 is fully charged 100%, and then goes off to a journey, and reports sensor and/or signal spectrum data, using cellular (WWAN high power) connectivity 654 to the cloud 656 every five mins for the next 10 days so that battery power decreases to 0%. In this scenario, battery power is not extended.

In an example embodiment, the second device 652 communicates with the first device 650 via a WPAN or WLAN link 658 and sends data in a low power mode to the first device 650 every five minutes. After 8 days, for example the battery power on the first device 650 drops to say ~20%, and battery power on the second device is at say 90+% due to low power connectivity usage. At this threshold, when the first device 650 reaches 20% (or other predetermined value), the roles reverse and first device 650 starts transmitting to the second device 652 every 5 mins using low power (BLE, WiFi, or others) connectivity 658 and the second device 652 transmits using high power links 654 until the battery power is drained to say 20% on device 652. In embodiments, the first and second devices can ping-pong connectivity modes until respective battery powers each 10%, 5%, and 0%, for example. With this arrangement, data for both devices is aggregated to one device for high power transmission so as to pool and extend battery life for the devices.

The first and second devices 650, 652 only using high power connectivity leads to a 10 day, for example, battery life. Using high and low power connections of the first second devices 650, 652 pools and extends battery life to 8+8=16 days, for example, of 5 minute interval reporting during a journey with the two devices. As the number N of devices increases, the number of days of aggregate battery power also multiples by at least X*N. It will be appreciated that the less power used for low power connectivity, the closer to 1 variable X gets. In embodiments, the battery power for multiple devices is pooled to extend the battery life of the multiples devices by effective low power and high power communication.

Figure 7:
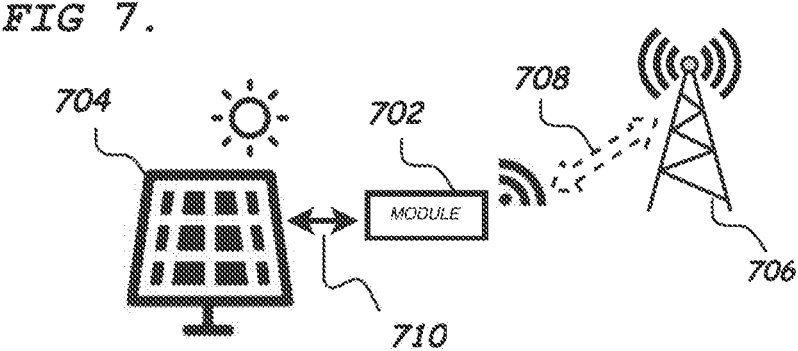
FIG. 7 illustrates an exemplary solar panel theft-prevention application in accordance with one or more embodiments.

FIG. 7 shows an exemplary application for tracking and tamper-proofing solar panels 704 in accordance with one or more embodiments. The device 702 in this case is attached to the solar panel 704 to ensure that the solar panel is not tampered with and moved from the installed location. This is used for theft prevention of the solar panel or other assets that are outdoors. In this case, an ambient light sensor can also be utilized to track the sun light shining directly on the solar panel. In one embodiment, the device 702 is attached or is part of the solar panel 704. The device 702 is configured to send periodical location and orientation data. In one or more embodiments, the update rate is set to once or twice a day, which is fairly infrequent. The device is also configured to detect abrupt motions or tampering with the solar pane. Once the tampering occurs, the device wakes up and the update rate is changed to a more frequent rate such as every 30 seconds or every minute to be able to accurately track the whereabouts of the solar panel 704.

Figure 8A:
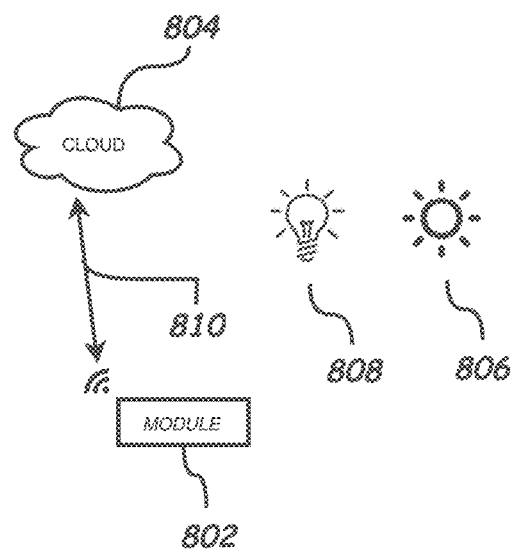
Figure 8B:
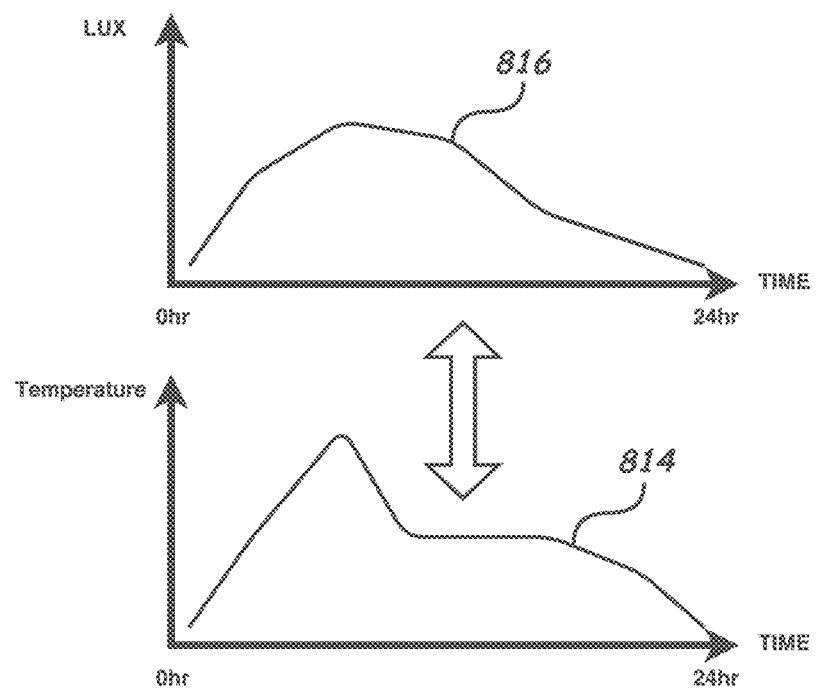

FIG. 8A and FIG. 8B show the device 802 with the ambient light sensor and temperature sensor. In one or more embodiments, the ambient light sensors will change intensity based on the sun 806 and or the other indoor or outdoor light source 808. The graphs in FIG. 8B show the correlation that can be done between the lux values 816 and temperature readings 814 to make sure that the temperatures are being read outdoors instead of indoors. The temperature correlation can help further validate the data and that can be shared with other third party vendors through APIs. In addition, to further validate the indoor or outdoor location of the device, the APIs from weather prognosis can be utilized to determine whether the client's temperature readings from the device are outdoor or indoor. Also the GPS/GNSS reception signals can be used to determine the device's precise location indoor or outdoor due to GPS mostly being available outdoors.

FIG. 9 illustrates an exemplary application in accordance with one or more embodiments where the data from the device 902 is anonymized, packaged and sold to or used by other third party applications such as Nest, Honeywell, Weather Channel, AccuWeather, IFTTT app, and many others 912. The API calls 910 can be tailored specifically for each application and the user data can be anonymized or remain non-anonymized depending on the application.

FIG. 10 shows an asset tracking application using the device 1002 in accordance with one or more embodiments. The device, which is battery powered, small, and compact, is an ideal device for tracking the environmental states and location of assets. For instance, the device 1002 can be placed in a bicycle 1006, car 1008, truck 1010, luggage 1012, package 1014, pallet 1016, or any other asset 1018. The sensor readings are then sent out to the cloud through its wireless connectivity 1004 capabilities. The device could be attached to any assets and be tracked and monitored throughout a period of time. The device can be configured to monitor particular metrics that are of interest for that asset, such as temperature, humidity, pressure, and any other sensible metrics that are part of the device. The asset 1018 could be monitored at various time intervals and then wirelessly 1004 sent to the cloud. This data could then be plotted or analyzed over time. The device can be attached to an asset using an adhesive, by utilizing the general-purpose hole, or by implementing the use of a custom case and potentially waterproofing the device.

In accordance with one or more embodiments, the remote computer system can change the reporting time period of the device in order to optimize the device's power savings depending on external factors that are determined by the remote system. One example of such an external factor is the device (and associated asset) being determined to be stuck in customs, or stuck over the weekend when carriers/shippers are not working. The remote system can algorithmically determine that this is the best time to change the device's reporting time period to stretch the battery life of the device. The selected changed reporting time period can vary depending on analysis by the remote system.

FIG. 11 shows an exemplary security implementation in accordance with one or more embodiments from a device 1102 to cloud while ensuring minimum data transmission. In one or more embodiments, various possible communication protocols shown in 1106 include TTP, HTTPS, MQTT, MQTTS, CoAP, XMPP, RESTful HTTP, and any other internet of things related protocols that could be utilized. When communicating and sending data over cellular network, there data usage costs associated with the use to network infrastructure, whereas costs are negligible with WiFi or Bluetooth, compared to cellular. The device reduces the amount of data sent while maintaining a high level of security. One of the ways to provide security is through the SSL protocol, which demands larger payloads due to overhead. The payload becomes bigger through SSL, and the computational power required for the encryption algorithms for SSL is quite high for a device that has a relatively limited power supply and requires a long battery lifetime. It should be noted that the increase in communication payload, as it relates to cellular communication, raises costs for the end user due to data usage. In addition to cost, computation requirements on SSL are demanding, which then increase power consumption of device and reduce overall battery lifetime. In order to keep the device secure and at the same time reduce overhead requirements of SSL, one embodiment is shown where the encryption occurs on the device using AES128, AES256 or other encryption algorithms. The encryption keys are stored in a secure server for each device, and when the device 1102 is programmed the key is securely stored on the device. Only the secure server 1108 and the device 1102 have the key for that particular device and the data sent is encrypted with the private key from the device and then also decrypted with that unique key on the cloud 1108. The device identification is then compared with the decrypted data to make sure that the data is coming from the actual device. The data is never the same as there is a random key generator that sends a one, two, or more letter/number combination, which is different for every transaction and that is also part of the encrypted message 1110.

FIG. 12 illustrates an exemplary device and cloud architecture and how the data flows from the device to the actual database tables on the cloud. In one embodiment, the cloud platform could be custom, or it could utilize one of the well-known cloud platforms such as Google Cloud Platform, Amazon AWS, Microsoft Azure, or other custom platform. In another embodiment the device 1202 sends the sensor data, spectrum data, network characteristics data, and any other data available from the device such as Bluetooth network characteristics and any Bluetooth beacons that the device can sense around its area. There are multiple POST/GET methods that can be utilized to send the data to the server as also described in FIG. 11 where different protocols could be implemented and used. In yet another embodiment, the data is sent using the POST method 1218 as an HTTP request to the server. Once the Device API 1216 receives the data it runs through multiple checks to validate that the data is coming from a real device, it has not been altered, and that the server is not being attacked with malicious hits. In order to read the data, the decryption 1214 of the data is performed. The decryption happens using a key that is unique to the device. The keys are securely stored internally on the device and on the server and accessed only when decryption of the data happens. After decryption, the integrity of the received and decrypted data string starts with a checksum 1204 such as CRC16, CRC32, or others, if that passes, the length of the data 1206 is verified. For each transaction, there is a unique request ID that is generated and this checks if the request ID 1208 is different from the last transaction. In order mitigate Denial of Service (DoS) attacks, a duplication check 1210 is performed to make sure that the same string is not being sent over and over again by an unauthorized client, where SSL is not utilized. In this case any duplicate data is ignored, this check most likely will not occur as it would have failed the unique request ID check 1208. If all of the above checks pass, a last check 1212 of confidence is performed to verify that the incoming data from the device correlates with the configuration of the device. For instance, if the data is being sent every minute and the device is configured to send every 15 minutes, this raises a flag. The device is then checked to make sure that the update rate is set to the client's desired update rate of every 15 minutes. Device API also communicates back to the actual device hardware with response such as SUCCESS of reception of data, and/or ERROR ###, where ### is an error number corresponding to an issue that the device has experienced. Upon successful checks, the device API also responds 1220 to the device for "Successful Reception" of data or an error code showing the reason why the data reception failed. If there are any configuration changes on the device, those are also sent at this time. In addition to responding to the device, the device API sends all the verified data to a queue for further processing, computation and storage.

FIG. 13 illustrates an exemplary method in accordance with one or more embodiments of processing the data that has been placed in queue by the Device API shown in FIG. 12. After the data has been Queued, the First-In-First-Out (FIFO) approach is implemented and scalability will be executed depending on the latency of the last queued message. As the latency increases, more resources are allocated to process 1302 the queued data in parallel. Once the device message is retrieved 1304 from the queue, another function also retrieves the last stored message for that particular device from cache 1308. In order to minimize cellular data usage, duplicate data from device are ignored and only data that changed from the previous message are sent to cloud. This reduces data charges and creates a de-duplication algorithm from which the device operates in. In order to support this approach to data de-duplication, the API receiving the data requires an additional function 1310, which compares the received message with the last cached message. The new data from the comparison then is saved in place of the last cached message. After this step, the data is extracted 1320 into multiple fields using a JSON parser or a delimiter parser depending on the data format used during transmission, and each field will be stored in its appropriate data table 1340 1338 1328 1326 1324 1322 1344. Prior to storing the data on tables, all external APIs are called to extracted further data, such as street address and mapping points 1312 from longitude and latitude data received from the device's GPS/GNSS. Another external API that is the cellular based location API (such as Combain, Unwired-Labs, OpenCellID, and/or others) 1314 is called to obtain an approximate location based on the Local Area Code (LAC), Mobile Network Code (MNC), Mobile Country Code (MCC), and CellID information obtained from base-stations near the device, providing additional information on the location of the device if there is no GPS availability. In addition to data related APIs, other APIs 1316 could also be called to further enrich the raw data received from the device. Another example of additional APIs would be temperature, humidity, and pressure related API. Based on raw location data, outside temperature, pressure, and humidity can be obtained using an external API (such as Accuweather, Weather.Com, and/or others) and that data can be stored for future or immediate correlative comparison to determine whether the device is outdoors or indoors. In addition, device connectivity management APIs 1342 are also utilized to observe connectivity session times, data usage, network carrier information, and others. These data points are then combined and stored into multiple tables. Raw data from the device is stored in a raw data table 1340. Spectrum monitoring data is stored in a separate table 1338, and all the environmental data are stored in table 1326. An additional aggregation function is also performed on the environmental data in order to improve the performance and reduce latency at the end user application as shown in FIG. 20. This aggregated data is then stored in multiple tables 1336 for various time steps. The same also occurs for the Inertial Measurement Unit (IMU) data 1328 1334, location and speed data 1324 1332, network characteristics data 1322 1330, connectivity related data 1344 1346, motion detection data and other data that goes into processing queue.

FIG. 14 illustrates exemplary usage of two or more subscriber identity modules (SIMs) in order to achieve cost effective global coverage using minimum number of product SKUs in accordance with one or more embodiments. In this example, a multiplexer 1404 is connected to two or more SIM cards inside the device 1402. Each SIM card (1406, 1408, or 1410) can be of a different form factor: 2FF, 3FF, 4FF, or embedded SIM card. In one embodiment, one SIM card 1406 is a micro SIM card (3FF) and the other one is an embedded SIM card 1408. The embedded SIM card 1408 can be used during manufacturing and is assigned to a particular Network Carrier or a Mobile Virtual Network Operator (MVNO) or a carrier that gets optimal coverage at great cost in a few key countries around the globe. However, there are countries in the world where the optimal coverage is not available and roaming charges are very high. For instance, in Kosovo (a country in Europe) the US+EU28 cell plan which covers USA and the 28 countries in EU goes into roaming charges. The roaming rates are high and are not economical to work with the already assembled embedded SIM card 1408. In this case, a second micro (3FF) SIM card can be utilized for a specific network carrier in countries where the embedded SIM would go into roaming. The microcontroller or processor of the device can be configured to determine which SIM card to utilize based on GPS/GNSS location, cellular signal availability, and/or lowest data rate costs at that location.

FIGS. 15A and 15B illustrate an exemplary spectrum monitoring application in accordance with one or more embodiments. The device 1502 can be configured to measure the RF power across the 2G/3G or 4G bands. For instance, the device is configured to receive power measurement at each band and channel 1514 of 2G (GSM or others) and 3G (UMTS or others) standards. Once the scanning is complete, each value then is stored in the microcontroller or processor of the device and the cellular connectivity module is restarted to transmit and connect to the cloud 1510. The stored data is then sent to the cloud with power measurement readings at each band of the GSM and UMTS standards acting as a spectrum analyzer 1512 for those bands 1514. The same can also be applied to all the LTE bands and power at each channel can be reported through a spectrum dashboard 1520. The spectrum analyzer dashboard will show frequency on the x-axis 1524 and the detected power at that band on the y-axis 1526 in terms of dBm or other power metrics. The circled region 1522 shows where there are signals in channels in that band.

FIG. 16 illustrates a loss of connectivity scenario and management of data in accordance with one or more embodiments in areas where there is no wide area access network connectivity. In one embodiment, the device could be placed inside a vehicle 1604 that is being tracked. The vehicle could be driving by mountainous areas 1608 or areas where there is no cellular coverage, and in this case the device inside the vehicle 1606 stores the sensor readings that it collects together with GPS/GNSS location into the internal memory 1606. The memory should preferably store at least 3 days' worth of readings such that if the vehicle is parked where there is no cellular or Wireless Local Area Network coverage for more than 3 days, the sensor measurements are still stored and kept in memory. Once the vehicle goes back to an area where there is cellular or other network coverage 1602 to access the cloud, all the data that was stored in the memory is sent out.

FIG. 17 shows the device connecting to cloud through another WPAN and WLAN/WWAN enabled device in accordance with one or more embodiments. In the illustrated example, the device is connected through WPAN 1706 (Bluetooth Smart in this case, and others are possible) to a smartphone 1704. The device transfers all the sensor readings and other data that it needs to send 1714 to the cloud 1710 to an app inside the smartphone 1704 that connects to the device 1708 directly through WPAN. This can occur when the device 1708 is synchronized with a smartphone 1704 through an app that recognizes the device 1708 and it accepts data from the device and then sends it to the cloud 1710 so that it can be consumed and utilized by a web application, smartphone app, desktop based software, or other tool. In this case the device could lose the WWAN/WLAN based connectivity, as shown in 1712, and connect to the smartphone 1704 through its WPAN enabled connectivity to conserve energy and use a lower power solution such as Bluetooth 1706 connection instead of the device's cellular connection 1712 to indirectly connect to WWAN or a cell tower 1702 as shown in one embodiment.

FIG. 18 illustrates a power management flow in minimizing power consumption and connecting to the cloud only when it is necessary depending on thresholds of various sensors. In one embodiment, in order to meet power consumption requirements such that the device could last for a few weeks, months, or years on battery, the most effective way of achieving this is by setting the device in deep sleep mode 1806 for as long as possible. Once the device is in sleep mode it should remain there and consume battery in less than a few nanowatts or microwatts such that the battery would last the longest time possible. In order to accomplish this, all the sensors on board are programmed to operate at their lowest power consumption and only change when there is an event that causes the device to wake up. The user has the ability to set transmission period times and manage sensor activity within the Web Application, Smartphone App, Desktop App, or any other application and stored in the cloud, where then the device would be configured accordingly as per user's preferences. In one embodiment we show various thresholds 1802 that could be set by the end user which could be done through an app on a smartphone, desktop, web browser, or other platform. For instance, a threshold alert of 80 degrees Fahrenheit could be set for temperature sensor. If a high or low threshold is reached or crossed, sleep mode is interrupted 1804 and the device is fully turned on, wireless connectivity session 1808 is established and sensor readings are sent. In one embodiment, examples of other thresholds are motion detection, light sensitivity, location perimeter (as also shown in FIG. 32), accelerometer, gyroscope, pressure, humidity. Timing interrupt 1802 can also be set such that the device wakes up from sleep mode based on a preset schedule or timer. In embodiments, the sensor device may be controlled and/or contain intelligence to increase battery power usage efficiency. In static environments, it may be desirable to obtain sensor data and/or transmit sensor data less often. For example, if a shipment will remain in a relatively stable environment, such as a warehouse, for some period time, it may be a waste of battery power to transmit data that will remain largely unchanged. It is desirable to determine when a shipment will be in a stable environment at unknown or unexpected times when en route, such as cancelled flights, bad weather delays, worker strikes, and the like.

FIG. 18A shows an example device reconfiguration to increase battery usage efficiency. In step 1850, the sensors on the device are configured to take measurements at selected time intervals and/or certain events. In step 1852, the device is configured to transmit at least some data at give time intervals, e.g., five times per hour, and/or in response to certain events. In step 1854, the sensor device stores sensor data and in step 1856 the device transmits the stored data at the configured time intervals. In step 1858, it is determined whether a configuration change has been sent via the cloud and received by the device. In embodiments, a sensor device can determine whether a configuration change should be implemented based on an event, for example. If there is no change, processing continues in step 1854. If there is a change, in step 1860, the device is reconfigured to implement the change(s) and processing continues.

As an example, a sensor device that is tracking a shipment is stuck in customs on Friday afternoon. The probability of the shipment clearing customs on Friday is low. Without this knowledge, if the device is configured to transmit every 5 minutes, the device continues transmitting throughout the weekend which may waste significant amounts of battery power. In embodiments, the cloud and/or device recognizes that shipment location is customs on a Friday afternoon and determines that the device will remain in customs until Monday. The cloud and/or sensor device then changes sensor data transmissions from every five minutes to every 6 hours until Monday morning at 8 am (local time) in order to save a significant amount of battery life.

In another aspect, a sensor device can reconfigure one or more settings in response to a deviation from a planned route. For example, a sensor device is coupled with a shipment with a predetermined route that is mapped to be within 2 miles of interstate I-90 at all times. If the sensor device transmits location data to the cloud, it can be determined that there has been a route deviation. In response to the route deviation, the cloud can command the sensor device to increase sensor measurement intervals and/or transmission times, such as from once per 30 mins to once every 5 mins.

FIG. 18B shows an example route having a series of points 1870, 1872, 1874, 1876 through which a sensor device should pass through on way to a destination. For example, the route can be an interstate truck route. As can be seen, a route deviation 1878 occurs at a certain point. The deviation 1878 may occur for any number of legitimate and illegitimate reasons including traffic, weather conditions, operator error, and/or theft. In an embodiment, upon detection that the sensor device is more than a select number of miles from the route defined between points 1872, 1874, the cloud commands the sensor device to increase sensor data collection and/or data transmission.

In another example, the sensor device can detect sensor data deviations and reconfigure one or more parameters. For example, temperature readings can detect 1-sigma, 2-sigma, etc., deviations. After transmission of the data to the cloud and/or onboard processing, for detection of the temperature deviation, the sensor device increases frequency from every 20 mins to every 1 min on sensing to ensure that a temperature profile has sufficient resolution.

In another example, the sensor device can detect shocks after which the device may take certain actions, such as initiate and/or increase sensor measurements, transmit sensor data, and the like. After detection of shock data anomaly, such as multiple shock events in a relatively short period of time, the sensor device can be reconfigured to transmit data more frequently. In embodiments, the sensor device can detect the shock anomaly and/or the cloud can detect the shock anomaly resulting in a command to the sensor device.

In another aspect, a sensor device includes waypoint configurations having different settings for various parameters. As the sensor device reaches respective waypoints, a corresponding waypoint causes the sensor device to be reconfigured.

In an example embodiment, a sensor device includes three waypoint (WP) configurations:
CONFIGURATION #1:
  GPS OFF,
  Cellular Location ON,
  WiFi-Based Location OFF,
  Transmission Frequency: every 1 hour
  Sensing of Temperature, Humidity: every 20 mins
  Shock Sensing: anything above 8 Gs
CONFIGURATION #2:
  GPS ON,
  Cellular Location ON,
  WiFi-Based Location ON,
  Transmission Frequency: every 20 mins
  Sensing of Temperature, Humidity: every 5 mins
  Shock Sensing: anything above 4 Gs
CONFIGURATION #3:
  GPS ON,
  Cellular Location ON,
  WiFi-Based Location ON,
  Transmission Frequency: every 5 mins
  Sensing of Temperature, Humidity: every 1 min
  Shock Sensing: anything above 2 Gs
The sensor device can be configured for expected waypoints (geofenced [GEOREFERENCED?locations) for a selected route. For example:
  WP #1: Factory in Detroit where product is manufactured and shipped from, and tracker is placed.
  WP #2: Distribution center of the shipping carrier
  WP #3: Warehouse where product is stored for shipping to end-consumer As shown in FIG. 18C, when the sensor device initializes, CONFIG #2 (CF#2) can be utilized. When the sensor device is 5 miles, for example, away from WP#1, CONFIG #1 (CF#1) can be applied so that the sensor device transmits less frequently. For example, the sensor device and associated shipping container are on an interstate journey that is going to take multiple days to get to WP#2. When the sensor device approaches WP#2 (e.g., within 10 miles), CONFIG #2 can be applied until it reaches the Distribution Center (DC). There, the sensor device transitions back to CONFIG #1 after two hours since it has reached the DC at WP#2. Once the sensor device is within 20 miles of the warehouse at WP#3 where most handling of the shipping container will occur, and the loading docks are scheduled accordingly, the sensor device transitions to CONFIG #3 to increase the amount of sensor data monitored and transmitted. For example, and estimated time of arrival (ETA) can be determined for the loading dock with desired resolution.

A similar approach can be used for a factory that utilizes Just-In-Time (JIT) delivery which requires continuous monitoring of supplier shipments. Consider an inbound example as follows:
  WP #1: Supplier of parts in Wisconsin places the tracker in the shipment.
  WP #2: Distribution center of the shipping carrier
  WP #3: Manufacturing site where the supplier part is crucial on building the final products.

Any practical number of waypoints and corresponding configurations can be set to meet the needs of a particular application, such as customer needs. Waypoints can be provided for a wide range of geographic locations and types of entities, such as seaports, airports, train stations, etc.

Another example is that when sensor device arrives at a seaport, the sensor device can transition to a seaport waypoint configuration to transmit at every 6 hours or every 12 hours since the shipping container/device is going to a ship and there is no need to attempt frequent transmission in the middle of the ocean. In addition, when the sensor device arrives at a different port that is close to the destination, the sensor device can transition to a waypoint configuration profile with more frequent reporting and/or sensing.

In another embodiment, a sensor device can transition to different configurations based on weather conditions at a particular location. For example, if there is a thunderstorm across an area at which the sensor device is present, a storm configuration, which can be sent to the sensor device by the cloud, for example, can better monitor the condition of the goods that are being transported.

In another embodiment, a stoppage configuration can be provided. For example, the sensor device can transition to a stoppage configuration based on information, such as strikes in airports or transportation systems. If there is a truck-driver employee strike in Paris, for example, goods may not move during the strike, e.g., for several days. Until the strike or other stoppage event ends, the sensor device can be configured to take less frequent sensor measurements and/or data transmissions.

It is understood that the configuration profiles can include settings for any sensor data collection parameter and/or any data transmission parameter described herein.

FIG. 19 is a table showing some of the features being added to LTE standards 1900 in order to support low power connectivity. The focus on the new LTE standards such as LTE-MTC, eMTC, and CIOT proposal are a clear sign that the industry is progressing towards standardization of networks together with end user wireless devices that can work on long distances (e.g., WWAN) and still be able to consume the least amount of power when communicating. This push is ideal for the devices described herein, which will be able to utilize any future improvement in cellular communication protocols to its advantage to further reduce power consumption and send sensor readings. In the new LTE standards modes such discontinuous receive (DRX) and discontinuous transmit (DTX) are enabled and the current proposed solution is ready to take advantage of the upcoming standards by efficiently turning on and off certain modules, chipsets, other components of the device. This could also be applied in turning on and off certain cellular transceiver's internal blocks to achieve high efficiency and increase battery lifetime.

FIG. 20 illustrates an exemplary process of collecting and sorting data for sensors such that display over time could be fast and efficient in accordance with one or more embodiments. The best way to depict this approach is by using an example of one sensor reading where the update rate is set to every 30 seconds. This would lead to 24*60*2=2880 data points per day, and that would lead to average of 30*2880=86400 data points per month and 12*86400=1,036,600, more than a million data points per year. If the request from the user is to display multiple sensor readings over a year, getting a million data points for each sensor would be very inefficient and would cause delays in retrieving and displaying such data. This would result in user experience that is not desirable. In order to improve this experience, a filter or buffer is designed in the cloud architecture such that data is pre-processed for the most optimal experience. The data is averaged on hourly sensor readings and stored in a separate table, averaged daily for all hour readings, average weekly on all daily readings, and finally average monthly on all daily readings. Having multiple tables would allow the end application to retrieve the data more efficiently (e.g., only 12 data points for the entire year or 365 data points for the entire year). This would result in an improved user experience and reduction in data display latency. This down sampling of data approach further improves user experience.

FIG. 21 illustrates an exemplary data verification and data integrity flow in accordance with one or more embodiments using a checksum to verify sensor data coming from the device. In one embodiment, the data 2102 from the sensor reading is serialized 2104 in order to consume the least amount of data space, through JSON or other protocols and then it is sent to a checksum algorithm 2106 and that could be a simple CRC algorithm or any other depending on the microprocessors capability to run the algorithm. In addition to the serialized data, the checksum and the sensor data length 2108 is then added to the message to make sure that its integrity is intact. After this process is complete the data is sent to the cloud 2110 through various means described above.

FIG. 22 shows use of a combination of GPS/GNSS, cellular location, Wireless Local Area Network and/or Wireless Personal Area Network to get a more accurate location for the device in accordance with one or more embodiments. The device 2202, which in addition to the sensors, contains the WWAN 2206, WPAN 2204, and GPS/GNSS 2008 capability. There are multiple third party APIs that can be utilized for the cellular, WiFi, BLE location. The WWAN cellular based information gives the device an idea of the cell base stations that it is connected to, which then can be utilized to get a rough estimate of its location. The GNSS enabled device also gets a 2D or 3D fix on the location of the device depending on the location of the device whether it could receive the satellite signals 2208. Another way of obtaining location of the device is through WPAN network by accessing databases that contain location of various fixed Bluetooth beacons or WiFi hotspots.

FIG. 23 shows an exemplary network diagnostic application in accordance with one or more embodiments at various locations and next to Distributed Antenna Systems (DAS) or Base Terminal Stations (BTS). In one embodiment multiple devices 2318 2320 2322 and 2324 are placed next to various network BTS towers 2304 2306 2308 and also distributed antenna systems (DAS) 2302. The devices then perform spectrum analyses on various bands for GSM, UMTS, LTE, and other standards and send that data back to the cloud 2314. This monitoring allows a user to use a dashboard 2316 to review and manage spectrum of each BTS tower and DAS location. This could enable a user to set threshold for spectrum power to make sure that unlicensed and unallocated signals do not suddenly appear in licensed bands. This spectrum monitoring dashboard would look similar to FIG. 15b.

FIG. 24 shows various antenna placements for GPS/GNSS, WWAN, WPAN, and WLAN connectivity on a device in accordance with one or more embodiments. The GPS/GNSS antenna 2400 can be a flexible and sticker like antenna that is attached on the case 2406. The multi-band cellular (WWAN) antenna 2402 is a separate PCB that is placed on the side of the device 2408. The Bluetooth antenna 2404 (2.4 GHz in one embodiment) for WPAN is shown and is also placed on a separate PCB that is placed on the opposite side of the device where the cellular antenna 2402 resides.

FIG. 25 shows a reusable plastic container application with rechargeable batteries in a stackable fashion in accordance with one or more embodiments. The devices 2514 are attached to the reusable plastic containers (RPCs) 2512 in a way such that they could be stackable 2506 and the power on each device could be stacked using USBs or other charging ports 2510. The stacked RPCs could then be plugged 2504 to a power source 2502 to charge overnight or when they are not being utilized inside a truck or a warehouse. Once the batteries 2508 inside the device are fully charged the RPCs could travel with various items such as tomatoes, produce, perishables, live cultures, and other items that are sensitive to various environmental changes. The environmental sensor together with the GPS/Cellular/WPAN/WLAN based location are generated from the device 2514 and sent to the cloud for tracking and alerting the end user if any undesired thresholds have been reached.

FIG. 26 illustrates an exemplary primary dashboard user interface 2600 for Sensing as a Service Platform and Web Application in accordance with one or more embodiments. The Sensing as a Service can be implemented as a web application for a web browser, a desktop application, a smartphone (e.g., iOS, Android, Symbian OS, or other OS) app, or any other software platform. The user interface can display all linked devices 2602 within left column. Users can switch between viewing detail information by clicking on device name listed vertically in the left column. Sensor alert level indicator 2602 is displayed to the left of device name. Selected device name and current calculated device location 2604 is displayed within the detail information pane. Module network connection, Bluetooth connection indicator, battery life level and device preferences control button are listed in top header 2606.

Individual sensor metrics (2608, 2610, 2612, 2614, 2616, 2618) are displayed in a grid interface below the selected sensor pane 2620. A dynamic graphical diagram, alert threshold settings, and additional detail information are available for each sensor metric when user clicks on sensor metric block.

The temperature sensor block 2608 displays current temperature level, the value change from previous reading, and the 24-hour high and low values. The sensor block also displays current alert state, shown in this example by a color alert indicator. Clicking on temperature detail 2608 initiates a change in selected sensor pane 2620.

The current device location detail block 2610 displays activity timer, current approximated location address, trip time, and trip distance. Trip time is a running timer that is reset after a certain amount of time (e.g., 30 minutes) of device inactivity. The trip distance is total distance traveled during that trip time. The location detail interface 2620 is the selected sensor detail for this figure.

The speed sensor block 2612 displays current speed, the value change from previous reading and the 24-hour high and low values. The speed sensor block also displays current alert state, shown here by grey alert indicator. Clicking on speed detail 2612 initiates a change in selected sensor pane 2620.

The humidity sensor block 2614 displays current humidity level, the value change from previous reading, and the 24-hour high and low values. The humidity sensor block also displays current alert state, shown here by grey alert indicator. Clicking on humidity detail 2614 initiates a change in selected sensor pane 2620.

The light sensor block 2616 displays current light level indication in matching light state and the LUX level. Level indication is derived from standard light level ranges. Sensor block also includes a horizontally oriented light level gradient and current level indicator. Sensor block also displays current alert state, shown here by grey alert indicator. Clicking on light detail 2616 initiates a change in selected sensor pane 2620.

The pressure sensor block 2618 displays current pressure level, the value change from previous reading, calculated altitude, and the 24-hour high and low values. The pressure sensor block also displays current alert state, shown here by grey alert indicator. Clicking on pressure detail 2618 initiates a change in selected sensor pane 2620.

The sensor blocks cab adjusted in an order that the user prefers and they can also support additional sensor metrics that other than the ones shown in FIG. 26.

Within the location sensor detail pane 2620, real-time device location is displayed 2622. Previous sensor transmission points can be indicated by points located to the north of current sensor location in the diagram. If one sensor metric value is above or below a set threshold at the time of transmission, the point is colored. Points are clickable and initiate a detail pane. Detail pane contains historical sensor metric data.

Other available views to location sensor detail are available to the user. Current selected state is the map location. Users can switch to view activity graph or preferences view by clicking on control buttons 2624.

All alerts within 24-hour period are listed in right column 2626. The column contains current region time, calculated by location. Alerts are ordered by most recent alert at top. Individual sensor alert items contain number of individual alert instances for that sensor and time elapsed since most recent alert event. Clicking on item vertically expands that selected alert notification, pushing other alert items down. In expanded state, individual alert events are presented with the value of alert and amount of time elapsed at the value.

The Account Name is displayed 2628 within the top-level header. Clicking name reveals general account navigation items including sign out.

FIG. 27 illustrates an exemplary device preferences interface 2700 of the Sensing as a Service Dashboard in accordance with one or more embodiments. In this example, the preferences page is accessed by clicking on gear icon 2702 from within the Web Application. There exist four primary preferences categories, General 2704, Module Sensors 2706, Cellular Network 2708 and Communication Settings 2710.

General preferences 2704 includes Device Name, Device ID Number, and Alert Contact Information such as cell phone number, email address, smartphones linked to the account where push notifications can be sent. Device name, cell phone number and email address are editable by the user by clicking on the item. Once a user has finished editing the value, a confirmation message is initiated. Before updating the user device information, the entered values are verified to be valid inputs. If an input is not valid, an error message is served.

Cellular Network 2706 displays current cellular network on which the device is connected, the signal strength, and cellular data usage. Data usage is displayed as an aggregate of all data across all networks. Current period and lifetime usage are available. The user also has the ability to set usage alerts. Alert would be sent to defined cell number via SMS, or defined email address via email when data usage is reaching predefined period limits. The user could also get notifications on the web based application, desktop application, or push notifications on their smartphone app.

Device Sensor preferences 2708 enable the user to toggle individual sensors On/Off. This preferences block is the primary workflow that defines the Sensing as a Service Platform and Web Application. Individual sensors are activated via monthly subscription. Additional sensors not available to user account can also be activated from within the Web Application. Clicking Activate button launches a subscription workflow. The subscription confirmation contains particular monetary subscription values for each sensor with associated term definitions. There could be different pricing plans such as affordable sensor bundles in which a user unlocks a set of sensor metrics for a reduced rate. For example, a Climate package could include temperature, humidity, and pressure at a certain value per month or year.

Communication Settings preferences 2710 displays sensor data communication frequency, calculated estimated battery life at the selected communication frequency, Bluetooth communications toggle and battery life information. Clicking on frequency dropdown displays alternative periods of communication. Based on selected period length, the estimated battery life is calculated and displayed in format of Days, Hours, Minutes. Bluetooth connection toggle turns communication On/Off. Current battery life is displayed with low battery alert control. If alert is set to On position, an alert would be sent to defined cell number via text and/or email address via email when battery life reaches 20%, 10% and 5%.

FIG. 28 illustrates alternate exemplary case designs for the electronic device in accordance with one or more embodiments. In one example, the device can be in different colors as shown in white 2802 and black 2804. The USB port can also be a micro USB 2806 and multiple LED light indicators 2808 can be provided to convey various states of the device as shown in FIG. 1E.

FIG. 29 illustrates an exemplary case of an electronic device 2902 having a clip attachment 2906 in accordance with one or more embodiments, which allows the device to be attached as a clip-on to a person 2908 that is being monitored and tracked. (In an alternative embodiment, the case can be attached to a wristband wearable by the person.) This device is particularly useful for Alzheimer, Autistic, and other at risk or elderly users. In one embodiment, this device is utilized to track the whereabouts of the patient 2910. A perimeter, box, square, rectangle, hexagon, octagon, polygon, or other shape 2918 is set around the residence. The device is configured to report back to the server using the WAN connectivity module, or through WPAN or WLAN connectivity modules depending on the residence and if there is WLAN/WPAN connectivity available that connects to the internet. When the person is inside the residence 2914, or inside the perimeter 2918 as indicated at 2912 and 2916, the GPS/GNSS coordinates read that the user is within the perimeter. However, if the user or person starts to wander away (indicated at 2910) from the perimeter 2918, the device reports it back to the server and end user is alerted. All other sensor metrics also inform key lifestyle states which can be set to alert the end user. Examples of this include, exceeding a set period of inactivity time or temperature alert for high/low temperatures, both indicating that something is out of the ordinary and may require attention.

FIGS. 30A and 30B show an exemplary PCB layout (top and bottom sides of the PCB) in accordance with one or more embodiments for a device where the type C USB 3008 could be used as a charger and as an adapter to program the internal processor (such as ARM, Intel, Renesas, or others) or a microcontroller using SWD or JTAG interface 3006 and 3004. In this exemplary PCB design the USB type-B 3010 is shown and used to connect to a computer or other serial USB interface for connecting the said device directly to the serial control link using its Type C 3008 connection. The connector 3006 is used for SW/JTAG type of communication with J-LINK or other products that are used for programming and debugging of micro-controller processors (MCUs).

FIG. 31 is a flow chart that illustrates exemplary sensing as a service in accordance with one or more embodiments. The first step 3102 of the process involves the user attempting to login to the sensor management and provisioning dashboard. In the next step, the user is authenticated and if the username and password are correct the user is directed to the dashboard 3104 where a display of all activated and deactivated sensors are presented. If login information is incorrect, an error message is served. In one embodiment, the temperature, pressure, and humidity sensors can be activated and every other sensor such as: GPS/GNSS location, cellular location, accelerometer, gyroscope, magnetometer, volatile organic compound detector, light sensor, infrared sensor, Bluetooth based location, and RF spectrum power monitor are deactivated. In the next step 3106, the user selects a few or all available sensors for activation. For example, the accelerometer and gyroscope could be selected for activation. As a result, a confirmation message is generated 3108 to ask the user to accept the terms and conditions and also the fees for the subscription to the two sensors as chosen in this example. The fee structures could be setup to be charged weekly, monthly, or any other time period. In addition, depending on when a user has subscribed to a set of sensors, the sensor fees could be prorated such that the billing cycle matches to the cycle that the user has initially chosen. The subscription model can also be setup such that each sensor is charged independently. Further, a new billing cycle can be setup and old sensor subscription fees could be prorated to match the new sensor billing cycle. After the user accepts the terms and fees (could also be free depending on the service) the sensors are enabled 3110 in this example and shown in the dashboard. In addition, during this step 3110, the electronic device is also configured to enable or disable one or more sensors depending on the activation or deactivation choice by the user.

FIG. 32 illustrates an exemplary alert perimeter for the location sensor such that when the electronic device goes outside of the perimeter it notifies the central server and user about its location and tracks the electronic device and its whereabouts. In this example, multi-point shape 3202 is created, and that shape could also be a random multi-point shape, square, circle, ellipse, polygon, or any other shape that the user could draw using a pencil tool in the application.

FIG. 33 is a block diagram illustrating components of a multi-sensor electronic device in accordance with one or more embodiments. The device includes a microcontroller (MCU) 3326, such as STM32 which is an ARM based microcontroller, or any other microcontroller or microprocessor. The memory 3328 is also connected to the MCU and the sensor data can be saved on the memory when the wireless connectivity is not available to send the data to the Internet. The device includes multiple sensors including, but not limited to: (1) inertial measurement unit (IMU) 3302, which has an accelerometer, gyroscope, magnetometer, motion detector, and orientation output for the device, (2) environmental sensors, which are comprised of a temperature sensor, humidity sensor, pressure sensor, and volatile compound detector 3304, (3) visible light and infrared sensor 3308, (4) radio frequency (RF) spectrum power sensor 3310 for various frequencies in the cellular bands. The device further includes GPS/GNSS receiver 3314 to provide longitude, latitude, speed, and other information that is available from GPS/GNSS receivers. The device also includes alarm sound buzzer 3306 used for finding the device or for any alerts or system information. The device also includes a multi-color LED indicator, which can be used as described in one example in FIG. 1E. The device further includes a WWAN cellular connectivity module 3324 that can work in various standards (2G/3G/4G), various bands, and various modes of operation. The device also includes a WPAN Bluetooth module 3322 that is used to communicate with other devices such as smartphones or other multi-sensor electronic device to form a mesh network. The device also includes antennas for GPS 3316, cellular connectivity 3318, and Bluetooth 3320. The cellular antenna could be changed to meet global cellular coverage requirements for 2G, 3G, 4G and 5G connectivity in the future.

The GPS/GNSS receiver 3314 can be a separate receiver or incorporated inside the WWAN cellular connectivity module 3324. The WPAN module 3322 could also be a ZigBee, Z-Wave, 6LoWPAN, or any other personal area network module. The WWAN module could meet one or more or any combination of cellular standards such as: GSM, UMTS, CDMA, WCDMA, LTE, LTE-A, LTE-Cat1, LTE-Cat0, LTE-MTC. WWAN module 3324 could also be a LoRA or a Sigfox module that connects to the non-cellular network focused of machine-to-machine (M2M) communications. WWAN module 3324 can be any other module that functions in wide area using wireless means of communication.

FIG. 34 is a flowchart illustrating an exemplary user sign in and sign up process in accordance with one or more embodiments to access the sensor management dashboard (web application). If user has an existing account and has already set up their account information, that user will enter the sign in flow from the primary website 3402 or directly through the sign in/sign up form page 3404. If submitted credentials are valid, user is directed to the primary dashboard page illustrated in FIG. 26 and represented here as Sensor Management Dashboard 3420. If login credentials are not valid, user will have ability to select a Forgot Password link to retrieve a token URL to reset account information. Upon resetting password, an alert notification will be sent to user email and phone number contacts.

If user does not have an existing account and is setting up account and devices for the first time 3404, the user selects sign up (create account) from available options on the sing in/sign up page. The user launches sign up process 3408 to activate account and add devices to account. Upon starting sign up flow, the user is prompted to enter general user information (name, email, phone number, address, company) 3410. The user is then prompted to link purchased devices to that account 3412. The user is able to add devices by either (1) turning on smart phone Bluetooth connection and selecting device from list of nearby turned on devices that are transmitting a Bluetooth signal or (2) entering device ID number to form field or (3) scanning a QR on device or (3) scanning a barcode on the device. At this time, when a user is adding devices to account, the user is able to give the device a custom name. Once all devices have been linked to an account, user is directed to the initial device setup interface 3414 in which they will do an initial setup of the individual device preferences (Fahrenheit or Celsius, Imperial or Metric units, which sensors are on/off and any associated alert thresholds). After completing this step, the user will have ability to add other members to their team and set up account types (admin, general—no editing rights). Invitation to join the sensor management portal for network of devices will be sent in email form to indicated email addresses. These users will then enter the sign up flow from a URL 3406. Upon sending additional member invitations, user is guided through a tutorial process of the dashboard 3420 which highlights key functionality. This tutorial is also available at any time to logged in users within the account information page. At completion of tutorial user is directed to the primary dashboard interface.

If a user is brought to the sign up process through an invitation link, the user is immediately prompted with the identical user information fields 3418, also presented in 3410. Upon completing this step, user is guided through a tutorial process of the dashboard 3420. At completion of tutorial user is directed to the primary dashboard interface.

FIGS. 35A and 35B illustrate an alternative exemplary case design 3502 for a device in accordance with one or more embodiments. A clip 3504 shown in FIGS. 35C and 35D can be removably attached to the case 3502 to secure the device to a package, pallet, or other asset.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

The invention claimed is:

1. A method, comprising:
   configuring a sensor device in accordance with a first configuration defining environmental data collection for a plurality of sensors and defining when the collected environmental data for the sensors is transmitted to a remote network, wherein the sensor device is coupled to an asset or good being shipped for collecting the environmental data as the asset or good is en route to a destination, wherein the environmental data includes at least temperature data; and
   receiving a transition signal by the sensor device from the remote network instructing the sensor device to transition to a second configuration, wherein the second configuration defines transmission of the collected environmental data less frequently than the first configuration.

2. The method according to claim 1, wherein the transition signal corresponds to an employee strike.

3. The method according to claim 1, wherein the transition signal corresponds to a deviation from a selected route for the shipping container to the destination.

4. The method according to claim 1, wherein the transition signal corresponds to an anomaly in the collected environmental data.

5. The method according to claim 1, wherein the first configuration corresponds to a first waypoint and the second configuration corresponds to a second waypoint, wherein the first and second waypoints are located on a selected route.

6. The method according to claim 1, wherein the transition signal corresponds to a weather condition.

7. The method according to claim 1, further including receiving the transition signal when the asset or good will remain in a given location for some period of time.

8. The method according to claim 7, wherein the given location comprises a warehouse.

9. The method according to claim 8, wherein the period of time includes at least one day of the weekend.

10. The method according to claim 1, furthering including transitioning to a third configuration defining environmental data collection for the plurality of sensors and defining when the collected environmental data for the sensors is transmitted to a remote network when the environmental data comprises a temperature deviation above a first threshold, wherein the third configuration defines collection of the environmental data more frequently than the second configuration.

11. The method according to claim 1, furthering including transitioning to a third configuration defining environmental data collection for the plurality of sensors and defining when the collected environmental data for the sensors is transmitted to a remote network when the asset or good arrives or departs a predetermined location, wherein the third configuration defines collection of the environmental data more frequently than the second configuration.

12. The method according to claim 1, wherein the transition signal corresponds to an anomaly in the collected data, wherein the anomaly comprises a shock event to the sensor device.

13. The method according to claim 11, wherein the shock event comprises multiple shocks within a given period of time.

14. A sensor device, comprising:
   a plurality of sensors to collect environmental data;
   a processor and memory configured to provide:
   a first configuration defining collection of the environmental data collection for the plurality of sensors and defining when the collected environmental data for the sensors is transmitted to a remote network, wherein the sensor device is configured to be coupled to an asset or good being shipped for collecting the environmental data as the asset or good is en route to a destination, wherein the environmental data includes at least temperature data; and wherein the sensor device is configured to receive a transition signal from a remote network instructing the sensor device to transition to a second configuration, wherein the second configuration defines transmission of the collected environmental data less frequently the first configuration.

15. The sensor device according to claim 14, wherein the transition signal corresponds to an employee strike.

16. The sensor device according to claim 14, wherein the transition signal corresponds to a deviation from a selected route for the shipping container to the destination.

17. The sensor device according to claim 14, wherein the transition signal corresponds to an anomaly in the collected environmental data, wherein the anomaly comprises a shock event to the sensor device.

18. The sensor device according to claim 14, wherein the first configuration corresponds to a first waypoint and the second configuration corresponds to a second waypoint, wherein the first and second waypoints are located on a selected route.

19. The sensor device according to claim 14, wherein the transition signal corresponds to a weather condition.

20. The sensor device according to claim 14, further including receiving the transition signal when the asset or good will remain in a given location for some period of time.

21. The sensor device according to claim 14, furthering including transitioning to a third configuration defining environmental data collection for the plurality of sensors and defining when the collected environmental data for the sensors is transmitted to a remote network when the environmental data comprises a temperature deviation above a first threshold, wherein the third configuration defines collection of the environmental data more frequently than the second configuration.

* * * * *